(12) United States Patent

Onoda et al.

(10) Patent No.: US 7,897,532 B2
(45) Date of Patent: Mar. 1, 2011

(54) OPTICAL GLASS COMPOSITION, PREFORM AND OPTICAL ELEMENT

(75) Inventors: Minoru Onoda, Osaka (JP); Kazuhiko Ishimaru, Osaka (JP); Shoji Nakamura, Osaka (JP)

(73) Assignee: Panasonic Corproation, Osaka (JP)

( * ) Notice: Subject to any disclaimer, the term of this patent is extended or adjusted under 35 U.S.C. 154(b) by 290 days.

(21) Appl. No.: 12/106,703

(22) Filed: Apr. 21, 2008

(65) Prior Publication Data

US 2008/0287280 A1    Nov. 20, 2008

(30) Foreign Application Priority Data

| Apr. 24, 2007 | (JP) | 2007-114812 |
| Apr. 24, 2007 | (JP) | 2007-114813 |
| Apr. 24, 2007 | (JP) | 2007-114814 |
| Apr. 24, 2007 | (JP) | 2007-114815 |
| Dec. 19, 2007 | (JP) | 2007-327545 |
| Dec. 19, 2007 | (JP) | 2007-327546 |
| Dec. 19, 2007 | (JP) | 2007-327547 |
| Dec. 19, 2007 | (JP) | 2007-327548 |

(51) Int. Cl.
C03C 3/062 (2006.01)
C03C 3/064 (2006.01)
C03C 3/066 (2006.01)
C03C 3/068 (2006.01)

(52) U.S. Cl. .......... 501/78; 501/73; 501/77; 501/79

(58) Field of Classification Search ........... 501/72, 501/77, 78, 79, 7, 793
See application file for complete search history.

(56) References Cited

U.S. PATENT DOCUMENTS

| 4,120,732 | A | * | 10/1978 | Komorita et al. | 501/42 |
| 4,268,312 | A | * | 5/1981 | Ishibashi et al. | 501/75 |
| 2004/0145815 | A1 | | 7/2004 | Endo | |
| 2005/0192174 | A1 | | 9/2005 | Yamamoto et al. | |
| 2005/0209085 | A1 | * | 9/2005 | Endo | 501/50 |
| 2006/0229186 | A1 | * | 10/2006 | Uehara et al. | 501/78 |
| 2008/0220961 | A1 | * | 9/2008 | Uehara et al. | 501/78 |

FOREIGN PATENT DOCUMENTS

| JP | H52129716 A | * | 10/1977 |
| JP | 2005-179142 | | 7/2005 |
| JP | 2005-239476 | | 9/2005 |
| JP | 2006-248897 | | 9/2006 |
| WO | WO/2005/118498 | * | 12/2005 |

* cited by examiner

*Primary Examiner* — Jerry Lorengo
*Assistant Examiner* — Noah S Wiese
(74) *Attorney, Agent, or Firm* — Pearne & Gordon LLP

(57) ABSTRACT

An optical glass composition contains, in % by weight, 1.0% or more and 12.0% or less of $SiO_2$, 8.0% or more and 18.0% or less of $B_2O_3$, 0% or more and 6.0% or less of ZnO, 1.0% or more and 10.0% or less of $ZrO_2$, 25.0% or more and 47.0% or less of $La_2O_3$, 0% or more and 5.0% or less of $R_2O$ (here, R is at least one of Li, Na and K), 0% or more and 15.0% or less of $Nb_2O_5$, 0% or more and 7.0% or less of $TiO_2$, 0% or more and 15.0% or less of $Ta_2O_5$, 1.0% or more of $Nb_2O_5+TiO_2+Ta_2O_5$, 0% or more and 25.5% or less of $Gd_2O_3$, 0.5% or more and 15.0% or less of $WO_3$ and 0.5% or more and 26.0% or less of $Gd_2O_3+WO_3$, and has nd of 1.88 or higher and 1.92 or lower and vd of 33 or higher and 37 or lower, and a preform and an optical element are formed from the optical glass composition.

31 Claims, No Drawings

OPTICAL GLASS COMPOSITION, PREFORM AND OPTICAL ELEMENT

CROSS-REFERENCE TO RELATED APPLICATION

This application is based on application Nos. 2007-114812, 2007-114813, 2007-114814 and 2007-114815 filed in Japan on Apr. 24, 2007, and application Nos. 2007-327545, 2007-327546, 2007-327547 and 2007-327548 filed in Japan on Dec. 19, 2007, the contents of which are hereby incorporated by reference.

BACKGROUND OF THE INVENTION

1. Field of the Invention

The present invention relates to an optical glass composition, a preform and an optical element. In particular, the present invention relates to: an optical glass composition suitable as the material of an optical element such as a lens element contained in a shooting lens system of a digital still camera or a digital video camera (simply referred to as a digital camera, hereinafter); a preform used in producing this optical element by press molding; and this optical element.

2. Description of the Background Art

In recent years, in digital cameras, various types ranging from common types to high-class types have been proposed in accordance with the consumers' needs. In such digital cameras, regardless of whether they are of common type or of high-class type, thickness reduction is strongly desired for improving portability. In order to achieve thickness reduction in a digital camera, reduction is indispensable in the thickness of the shooting lens system which occupies a relatively large volume.

For the purpose of thickness reduction in a shooting lens system, reduction in the number of lens elements is effective. Nevertheless, in recent years, increasingly high optical performance is required in shooting lens systems. Thus, reduction in the number of lens elements is reaching a limit, and hence remarkable further reduction is unexpectable. Accordingly, for the purpose of thickness reduction in a shooting lens system, thickness reduction becomes necessary in the individual lens elements contained in the shooting lens system.

For the purpose of thickness reduction in a lens element, it is effective to increase the refractive index of the glass material that forms the lens element. As examples of such a glass material having a high refractive index, optical glass is described in Japanese Laid-Open Patent Publication No. 2005-239476 and Japanese Laid-Open Patent Publication No. 2005-179142.

In an imaging lens system, aberration compensation is necessary. Then, in general, the aberration is compensated by variously combining the optical indices such as the refractive indices (nd) and the dispersions (vd: Abbe numbers) of the lens elements and the shapes of the lens elements. Thus, aiming at thickness reduction, when glass having a high refractive index is used merely abundantly, the aberration cannot be compensated successfully.

Among such imaging lens systems, in a zoom lens system, intervals between a plurality of lens units are changed so that variable magnification is achieved. Thus, aberration compensation like chromatic aberration compensation need be performed to an extent in each lens unit. Accordingly, each lens unit need contain at least two lens elements consisting of a lens element having positive optical power and a lens element having negative optical power. Nevertheless, from the viewpoint of aberration compensation, certain constraints are present on the optical indices such as the refractive indices (nd) and the dispersions (vd: Abbe numbers) of such two lens elements.

Japanese Laid-Open Patent Publication No. 2005-239476 discloses optical glass having a refractive index as high as exceeding 2.00. When such optical glass is used for the lens element having positive optical power in the lens unit of the zoom lens system, a high effect is obtained in reducing the thickness of the lens unit. Nevertheless, a strong tendency is present that in a refractive index range as high as exceeding 2.00, the Abbe number (vd) becomes low. Thus, for the lens element having negative optical power, optical glass is desired that has a relatively high refractive index and a high Abbe number. Specifically, for the lens element having negative optical power, optical glass is necessary that has a refractive index (nd) to the d-line falling within a range of 1.88 or higher and 1.92 or lower and an Abbe number (vd) to the d-line falling within a range of 33 or higher and 37 or lower. Further, in some cases, in addition to the constraints on these optical indices, excellent heat characteristics are required in the optical glass at the time of heat treatment in producing the optical element. Nevertheless, these Japanese Laid-Open Patent Publication No. 2005-239476 and Japanese Laid-Open Patent Publication No. 2005-179142 do not describe optical glass that has a refractive index (nd) to the d-line falling within a range of 1.88 or higher and 1.92 or lower and an Abbe number (vd) to the d-line falling within a range of 33 or higher and 37 or lower. Further, these documents do not describe optical glass that has a refractive index to the d-line and an Abbe number to the d-line falling within the above-mentioned ranges and also has excellent heat characteristics.

SUMMARY OF THE INVENTION

An object of the present invention is to provide: an optical glass composition that has a refractive index (nd) to the d-line falling within a high refractive index range of 1.88 or higher and 1.92 or lower and yet has an Abbe number (vd) to the d-line falling within a range of 33 or higher and 37 or lower; an optical glass composition that has a refractive index (nd) to the d-line falling within a high refractive index range of 1.88 or higher and 1.92 or lower and yet has an Abbe number (vd) to the d-line falling within a range of 33 or higher and 37 or lower and excellent heat characteristics; and a preform and an optical element formed from these optical glass compositions.

The novel concepts disclosed herein were achieved in order to solve the foregoing problems in the conventional art, and herein is disclosed:

an optical glass composition comprising, in % by weight, 1.0% or more and 12.0% or less of $SiO_2$, 8.0% or more and 18.0% or less of $B_2O_3$, 0% or more and 6.0% or less of ZnO, 1.0% or more and 10.0% or less of $ZrO_2$, 25.0% or more and 47.0% or less of $La_2O_3$, 0% or more and 5.0% or less of $R_2O$ (here, R is at least one of Li, Na and K), 0% or more and 15.0% or less of $Nb_2O_5$, 0% or more and 7.0% or less of $TiO_2$, 0% or more and 15.0% or less of $Ta_2O_5$, 1.0% or more of $Nb_2O_5+TiO_2+Ta_2O_5$, 0% or more and 25.5% or less of $Gd_2O_3$, 0.5% or more and 15.0% or less of $WO_3$ and 0.5% or more and 26.0% or less of $Gd_2O_3+WO_3$, and having a refractive index (nd) to the d-line of 1.88 or higher and 1.92 or lower and an Abbe number (vd) to the d-line of 33 or higher and 37 or lower.

The novel concepts disclosed herein were achieved in order to solve the foregoing problems in the conventional art, and herein is disclosed:

a preform comprising just above-mentioned optical glass composition, that is softened by heating so as to be used at least for press molding.

The novel concepts disclosed herein were achieved in order to solve the foregoing problems in the conventional art, and herein is disclosed:

an optical element comprising just above-mentioned optical glass composition.

The novel concepts disclosed herein were achieved in order to solve the foregoing problems in the conventional art, and herein is disclosed:

an optical glass composition comprising, in % by weight,
1.0% or more and 12.0% or less of $SiO_2$,
8.0% or more and 18.0% or less of $B_2O_3$,
0% or more and 6.0% or less of ZnO,
1.0% or more and 10.0% or less of $ZrO_2$,
25.0% or more and 47.0% or less of $La_2O_3$,
0% or more and 5.0% or less of $R_2O$ (here, R is at least one of Li, Na and K),
0% or more and 15.0% or less of BaO,
0% or more and 15.0% or less of $Nb_2O_5$,
0% or more and 7.0% or less of $TiO_2$,
0% or more and 15.0% or less of $Ta_2O_5$,
2.0% or more of $Nb_2O_5+TiO_2+Ta_2O_5$,
0% or more and 20.0% or less of $Gd_2O_3$,
0.5% or more and 10.0% or less of $WO_3$ and
10.0% or more and 16.0% or less of $Nb_2O_5+WO_3$, and having a refractive index (nd) to the d-line of 1.88 or higher and 1.92 or lower and an Abbe number (vd) to the d-line of 33 or higher and 37 or lower.

The novel concepts disclosed herein were achieved in order to solve the foregoing problems in the conventional art, and herein is disclosed:

a preform comprising just above-mentioned optical glass composition, that is softened by heating so as to be used at least for press molding.

The novel concepts disclosed herein were achieved in order to solve the foregoing problems in the conventional art, and herein is disclosed:

an optical element comprising just above-mentioned optical glass composition.

The novel concepts disclosed herein were achieved in order to solve the foregoing problems in the conventional art, and herein is disclosed:

an optical glass composition comprising, in % by weight,
1.0% or more and 12.0% or less of $SiO_2$,
8.0% or more and 18.0% or less of $B_2O_3$,
0% or more and 6.0% or less of ZnO,
1.0% or more and 10.0% or less of $ZrO_2$,
25.0% or more and 47.0% or less of $La_2O_3$,
0.5% or more and 4.0% or less of $Li_2O$,
0% or more and 16.0% or less of $Nb_2O_5$,
0% or more and 7.0% or less of $TiO_2$,
0% or more and 15.0% or less of $Ta_2O_5$,
1.0% or more of $Nb_2O_5+TiO_2+Ta_2O_5$,
0% or more and 26.0% or less of $Gd_2O_3$ and
0% or more and 15.0% or less of $WO_3$, and having a refractive index (nd) to the d-line of 1.88 or higher and 1.92 or lower, an Abbe number (vd) to the d-line of 33 or higher and 37 or lower and a yield temperature of 700° C. or lower.

The novel concepts disclosed herein were achieved in order to solve the foregoing problems in the conventional art, and herein is disclosed:

a preform comprising just above-mentioned optical glass composition, that is softened by heating so as to be used at least for press molding.

The novel concepts disclosed herein were achieved in order to solve the foregoing problems in the conventional art, and herein is disclosed:

an optical element comprising just above-mentioned optical glass composition.

The novel concepts disclosed herein were achieved in order to solve the foregoing problems in the conventional art, and herein is disclosed:

an optical glass composition comprising, in % by weight,
1.0% or more and 12.0% or less of $SiO_2$,
8.5% or more and 18.0% or less of $B_2O_3$,
0% or more and 6.0% or less of ZnO,
1.0% or more and 10.0% or less of $ZrO_2$,
25.0% or more and 47.0% or less of $La_2O_3$,
0% or more and 5.0% or less of $R_2O$ (here, R is at least one of Li, Na and K),
0% or more and 16.0% or less of $Nb_2O_5$,
0% or more and 7.0% or less of $TiO_2$,
0% or more and 15.0% or less of $Ta_2O_5$,
1.0% or more of $Nb_2O_5+TiO_2+Ta_2O_5$,
0% or more and 26.0% or less of $Gd_2O_3$ and
0% or more and 13.0% or less of $WO_3$, and
substantially not containing R'O (here, R' is at least one of Ba, Sr, Ca and Mg), and having a refractive index (nd) to the d-line of 1.88 or higher and 1.92 or lower and an Abbe number (vd) to the d-line of 33 or higher and 37 or lower.

The novel concepts disclosed herein were achieved in order to solve the foregoing problems in the conventional art, and herein is disclosed:

a preform comprising just above-mentioned optical glass composition, that is softened by heating so as to be used at least for press molding.

The novel concepts disclosed herein were achieved in order to solve the foregoing problems in the conventional art, and herein is disclosed:

an optical element comprising just above-mentioned optical glass composition.

The present invention realizes:

an optical glass composition that has a refractive index (nd) to the d-line falling within a high refractive index range of 1.88 or higher and 1.92 or lower and yet has an Abbe number (vd) to the d-line falling within a range of 33 or higher and 37 or lower; and an optical glass composition that has a refractive index (nd) to the d-line falling within a high refractive index range of 1.88 or higher and 1.92 or lower and yet has an Abbe number (vd) to the d-line falling within a range of 33 or higher and 37 or lower and a yield temperature of 700° C. or lower.

The present invention further realizes:

a preform used in producing an optical element by press molding from an optical glass composition that has a refractive index (nd) to the d-line falling within a high refractive index range of 1.88 or higher and 1.92 or lower and yet has an Abbe number (vd) to the d-line falling within a range of 33 or higher and 37 or lower; and a preform used in producing an optical element by press molding from an optical glass composition that has a refractive index (nd) to the d-line falling within a high refractive index range of 1.88 or higher and 1.92 or lower and yet has an Abbe number (vd) to the d-line falling within a range of 33 or higher and 37 or lower and a yield temperature of 700° C. or lower.

The present invention yet further realizes:

an optical element formed from an optical glass composition that has a refractive index (nd) to the d-line falling within a high refractive index range of 1.88 or higher and 1.92 or lower and yet has an Abbe number (vd) to the d-line falling within a range of 33 or higher and 37 or lower; and an optical element formed from an optical glass composition that has a refractive index (nd) to the d-line falling within a high refractive index range of 1.88 or higher and 1.92 or lower and yet has an Abbe number (vd) to the d-line falling within a range of 33 or higher and 37 or lower and a yield temperature of 700° C. or lower.

This and other objects and features of this invention will become clear from the following description, taken in conjunction with the preferred embodiments.

DESCRIPTION OF THE PREFERRED EMBODIMENTS

Embodiment I-1

First, an optical glass composition according to Embodiment I-1 of the present invention is described below in detail. This optical glass composition has the following composition.

That is, the optical glass composition according to the present Embodiment I-1 contains, in % by weight, 1.0% or more and 12.0% or less of $SiO_2$, 8.0% or more and 18.0% or less of $B_2O_3$, 0% or more and 6.0% or less of ZnO, 1.0% or more and 10.0% or less of $ZrO_2$, 25.0% or more and 47.0% or less of $La_2O_3$, 0% or more and 5.0% or less of $R_2O$ (here, R is at least one of Li, Na and K), 0% or more and 15.0% or less of $Nb_2O_5$, 0% or more and 7.0% or less of $TiO_2$, 0% or more and 15.0% or less of $Ta_2O_5$, 1.0% or more of $Nb_2O_5+TiO_2+Ta_2O_5$, 0% or more and 25.5% or less of $Gd_2O_3$, 0.5% or more and 15.0% or less of $WO_3$ and 0.5% or more and 26.0% or less of $Gd_2O_3+WO_3$. From this optical glass composition, more stable optical glass is obtained that has a refractive index (nd) to the d-line of 1.88 or higher and 1.92 or lower and an Abbe number (vd) to the d-line of 33 or higher and 37 or lower.

Next, the individual components contained in the optical glass composition are described below in detail. Hereinafter, the contents of the individual components are expressed in % by weight.

$SiO_2$ serves as a component for composing a network, and is an essential component for improving devitrification resistance. Nevertheless, when the amount of $SiO_2$ exceeds 12.0%, its solubility becomes poor, and hence difficulty arises in stable preparing. Further, its liquidus temperature goes high, and hence difficulty arises in preparing. In contrast, when the amount of $SiO_2$ is less than 1.0%, the devitrification resistance becomes poor, and hence the glass becomes unstable. A preferable amount of $SiO_2$ is 1.0% or more and 10.5% or less, and a more preferable amount is 3.0% or more and 8.5% or less.

$B_2O_3$ serves as a component for composing a network, and has the effect of lowering a temperature range necessary for ensuring a desired melting property and a desired viscous flow. Nevertheless, when the amount of $B_2O_3$ exceeds 18.0%, the refractive index becomes excessively low. In contrast, when the amount of $B_2O_3$ is less than 8.0%, the temperature range necessary for ensuring a desired melting property and a desired fluidity becomes excessively high. A preferable amount of $B_2O_3$ is 9.0% or more and 16.0% or less.

ZnO has the effects of improving the devitrification resistance and lowering the temperature necessary for viscous flow. When the amount of ZnO falls outside a range of 0% or more and 6.0% or less, difficulty arises in adjusting the refractive index (nd) and the Abbe number (vd) into desired ranges. A preferable amount of ZnO is 2.0% or more and 6.0% or less.

$ZrO_2$ has the effects of improving the refractive index and also improving the devitrification resistance. When the amount of $ZrO_2$ is less than 1.0%, the effect of improving the refractive index decreases. In contrast, when the amount of $ZrO_2$ exceeds 10.0%, the devitrification resistance becomes poor and so does the solubility. A preferable amount of $ZrO_2$ is 2.0% or more and 9.0% or less.

$La_2O_3$ improves the refractive index, and is one of the most important components that control the Abbe number. When the amount of $La_2O_3$ is less than 25.0%, difficulty arises in adjusting the Abbe number into a desired range. In contrast, when the amount of $La_2O_3$ exceeds 47.0%, the devitrification resistance becomes poor. Thus, glass becomes unstable, and hence difficulty arises in preparing. A preferable amount of $La_2O_3$ is 26.0% or more and 45.0% or less.

$R_2O$ (here, R is at least one of Li, Na and K) has the effect of lowering glass transition temperature (denoted by Tg, hereinafter) so as to improve the melting property. In particular, $Li_2O$ is the most effective. Nevertheless, when an excessive amount of $R_2O$ is used, remarkable degradation arises in the devitrification resistance and the refractive index. Thus, the amount of $R_2O$ is set to be 0% or more and 5.0% or less and, preferably, 0% or more and 3.0% or less. Here, in order that Tg should be lowered so that the effect of improving the melting property should be achieved more successfully, it is preferable that the amount of $R_2O$ is 0.5% or more.

Similarly to $La_2O_3$, $Nb_2O_5$ improves the refractive index, and is one of the components that control the Abbe number. Further, when $La_2O_3$ is replaced by $Nb_2O_5$, the effect of improving the devitrification resistance is also obtained. Nevertheless, when an excessive amount of $Nb_2O_5$ is used, difficulty arises in adjusting the Abbe number into a desired range. Thus, the amount of $Nb_2O_5$ is set to be 0% or more and 15.0% or less and, preferably, 0% or more and 12.0% or less. Here, in order that the effect of improving the refractive index and the devitrification resistance should be achieved more successfully, it is preferable that the amount of $Nb_2O_5$ is 0.5% or more.

$TiO_2$ has the effects of controlling the refractive index and the Abbe number and improving the devitrification resistance. Nevertheless, when an excessive amount of $TiO_2$ is used, difficulty arises in adjusting the Abbe number into a desired range. Thus, the amount of $TiO_2$ is set to be 0% or more and 7.0% or less and, preferably, 0% or more and 5.0% or less. Here, in order that the effect of improving the refractive index and the devitrification resistance should be achieved more successfully, it is preferable that the amount of $TiO_2$ is 0.5% or more.

Similarly to $La_2O_3$, $Ta_2O_5$ improves the refractive index, and is one of the components that control the Abbe number. Nevertheless, when an excessive amount of $Ta_2O_5$ is used, the melting property becomes poor, and hence difficulty arises in preparing. Thus, the amount of $Ta_2O_5$ is set to be 0% or more and 15.0% or less and, preferably, 0% or more and 12.0% or less. Here, in order that the effect of improving the refractive index should be achieved more successfully, it is preferable that the amount of $Ta_2O_5$ is 0.5% or more.

Here, in order that high devitrification caused by $La_2O_3$ should be alleviated and that the refractive index and the Abbe number should be adjusted into desired ranges, it is preferable that at least one of the above-mentioned $Nb_2O_5$, $TiO_2$ and $Ta_2O_5$ is used. Specifically, the total amount of $Nb_2O_5$, $TiO_2$ and $Ta_2O_5$ ($Nb_2O_5+TiO_2+Ta_2O_5$) is adjusted into 1.0% or more and, preferably, into 10.0% or more. Here, when the total amount is excessive, this can cause possibilities that difficulty arises in adjusting the Abbe number into a desired range and that the melting property becomes poor and hence difficulty arises in preparing. Thus, it is preferable that the total amount is adjusted into 30.0% or less.

Similarly to $La_2O_3$, $Gd_2O_3$ improves the refractive index, and is one of the components that control the Abbe number. Nevertheless, when an excessive amount of $Gd_2O_3$ is used, the devitrification resistance becomes poor. Thus, glass becomes unstable, and hence difficulty arises in preparing. Thus, the amount of $Gd_2O_3$ is set to be 0% or more and 25.5% or less and, preferably, 0% or more and 20.0% or less. Here, in order that the effect of improving the refractive index should be achieved more successfully, it is preferable that the amount of $Gd_2O_3$ is 0.5% or more.

$WO_3$ is a component for alleviating the high devitrification caused by $La_2O_3$ and adjusting the refractive index and the Abbe number into desired ranges. Nevertheless, when the amount of $WO_3$ exceeds 15.0%, the transmissivity in a blue light range becomes poor. In contrast, when the amount of $WO_3$ is less than 0.5%, the effect of improving the devitrification is not achieved. A preferable amount of $WO_3$ is 0.5% or more and 13.0% or less, and a more preferable amount is 3.0% or more and 10.0% or less.

Here, in order that the refractive index and the Abbe number should be adjusted into desired ranges, the total amount of the above-mentioned $Gd_2O_3$ and $WO_3$ ($Gd_2O_3+WO_3$) is 0.5% or more and 26.0% or less and, preferably, 10.0% or more and 16.0% or less.

BaO is a component that improves preparing property, and may be used within a range of 0% or more and 15.0% or less. Here, alkali earth metal oxides R'O (here, R' is at least one of Sr, Ca and Mg) other than the BaO have a tendency that when an excessive amount is used, the devitrification resistance becomes poor. Thus, non-use of these is preferable. Accordingly, when the use of R'O is unavoidable, their total amount is set to be 0% or more and 15% or less.

Similarly to $La_2O_3$, $Y_2O_3$ and $Yb_2O_3$ improve the refractive index, and are components that control the Abbe number. Nevertheless, when an excessive amount of these $Y_2O_3$ and $Yb_2O_3$ is used, the devitrification resistance becomes poor. Thus, glass becomes unstable, and hence difficulty arises in preparing. Thus, when $La_2O_3$ need be replaced by these $Y_2O_3$ and $Yb_2O_3$, the amount of each is set to be 0% or more and 10% or less.

$GeO_2$ may be used as a replacement of $SiO_2$, and serves as a component for composing a network. Thus, $GeO_2$ may be added by up to 12.0%. Nevertheless, when an excessive amount of $GeO_2$ is used, this causes a possibility that the devitrification resistance becomes poor. Thus, it is preferable that the amount of $GeO_2$ is 12.0% or less.

$Al_2O_3$ may be used for adjusting the refractive index. However, it is preferable that the amount is 0% or more and 10% or less. Further, in order to adjust the refractive index, $Ga_2O_3$ and $In_2O_3$ may be used in an amount up to approximately 10% each. Nevertheless, the use of these causes a possibility that the devitrification resistance becomes poor. Thus, it is preferable that these are not used in an excessive amount.

In addition to the above-mentioned components, $Sb_2O_3$ and $SnO_2$ may be used which are generally used as fining agents. Here, it is preferable that the amount of $Sb_2O_3$ and $SnO_2$ is 0% or more and 2% or less each. Nevertheless, $As_2O_3$ having a strong effect as a fining agent is toxic. Thus, it is preferable that $As_2O_3$ is not used.

In addition, as for Pb and its compounds, compounds including Te, Se, or Cd, as well as radioactive substances such as compounds including U or Th, it is preferable that they are not used from the viewpoint of safety. Further, it is also preferable that substances such as compounds including Cu, Cr, V, Fe, Ni or Co that cause coloring are not used.

When the individual components are adjusted into the above-mentioned ratios, an optical glass composition is obtained that has a refractive index (nd) to the d-line of 1.88 or higher and 1.92 or lower and an Abbe number (vd) to the d-line of 33 or higher and 37 or lower.

Here, when the glass is handled in a softened or molten state, from the viewpoints of melting property, processability (droplet property), crystallinity and the like, a lower liquidus temperature is generally preferable in the optical glass. However, in the optical glass composition according to the present Embodiment I-1, lowering the liquidus temperature is not an indispensable condition. That is, even in an optical glass having a high liquidus temperature, it is preferable that a temperature range is selected that permits processing without losing various features of the glass.

Embodiment I-2

Next, a preform according to Embodiment I-2 of the present invention and a producing method for the same are described below in detail. The preform is softened by heating so as to be used at least for press molding. Thus, the weight and the shape of the preform are determined appropriately in accordance with the size and the shape of a press molded article serving as a final target. The preform according to the present Embodiment I-2 is formed from the optical glass composition according to the above-mentioned Embodiment I-1, and hence obtained without losing various features of the optical glass composition in Embodiment I-1.

The preform produced from the optical glass composition according to Embodiment I-1 is described below. Here, the preform is a preliminary glass form that is heated and used for precision press molding. The preforms are divided into a gob preform produced by forming a molten glass material and a polished preform produced by physically polishing a glass material. The optical glass composition according to Embodiment I-1 can be used for both of the gob preform and the polished preform.

The producing method for the preform is described below. First, glass raw materials (the above-mentioned individual components) for the optical glass composition according to the above-mentioned Embodiment I-1 are weighed and prepared, and then processed in processing steps such as dissolution, defoaming, fining and homogenization so that homogeneous molten glass is obtained which contains no foreign substances therein. Then, at the time when the molten glass is caused to flow out through an outflow pipe (referred to as a nozzle, hereinafter) made of platinum alloy or the like, a temperature condition for the vicinity of the nozzle is set up strictly into a range of not causing devitrification in the glass. The molten glass flowing out is cast into a receiving die having a receiving surface of planar shape, concave shape, convex shape or the like or into a molding die in which an enclosure is provided in the circumference of a planar surface, a concave surface or a convex surface. As a result, the molten glass is formed into a desired shape. In the following description, preferable forming methods are illustrated.

A first forming method is one example of producing methods for the gob preform. First, a molten glass lump having a weight corresponding to a final molded article or alternatively a desired weight including an addition necessary for secondary processing into a final molded article is dropped into each of a plurality of receiving dies arranged under the nozzle. Then, cooling is performed simultaneously to the forming of glass lumps so that gob preforms are obtained.

A second forming method is another example of producing methods for the gob preform. The second forming method is suitable for a case that a preform having a relatively heavy weight is to be produced. First, the tip of the molten glass flowing out through the nozzle is brought into contact with the receiving die surface. Then, at each time when a desired weight is reached, preform for polish having a desired weight can be obtained from the optical glass composition according to Embodiment I-1. In the case of a preform for press molding, for the purpose of mold release at the time of forming, it is preferable that the surface roughness of the receiving die surface is adjusted or alternatively that a mold-release film is formed. In the case of a preform for polish, when an HBN (boron-containing mold-releasing agent) is applied, releasing from the die becomes easier. Thus, this approach is preferable.

Embodiment I-3

Next, an optical element according to Embodiment I-3 of the present invention is described below. The optical element according to Embodiment I-3 has optical indices determined by the composition of the optical glass composition according to the above-mentioned Embodiment I-1. That is, the refractive index (nd) to the d-line is 1.88 to 1.92, while the Abbe number (vd) to the d-line is 33 to 37. Further, this optical element has also a feature that optical absorption by coloring is low in a visible light range. The optical element employing the optical glass composition according to Embodiment I-1 is an optical element suitable for an optical system in a digital camera, a video camera, a mobile device or the like.

Examples of the optical element according to the present Embodiment I-3 include a spherical lens, an aspheric lens and a micro lens, as well as a prism and a diffraction grating. Other examples include an optical element cemented with an optical element composed of a glass material or an optical material of another kind.

Next, a producing method for the optical element according to Embodiment I-3 is described below. The optical element according to Embodiment I-3 can be produced by supplying the preform according to the above-mentioned Embodiment I-2 into a molding die, then softening it by heating, then performing press molding, and then performing polish when necessary.

Press molding methods employable for obtaining the optical element are divided into two typical methods. These methods are selected depending on the means of forming optically functional surfaces where light enters and exits.

First means is means referred to as precision press molding. The molding surfaces of a press molding die are precisely processed in advance into reversal shapes of the optically functional surfaces of the optical element serving as a final molded article. Then, when necessary, a mold-release film is provided in order to avoid fusion between the preform and the molding die. Then, press molding is performed so that the shape of the above-mentioned molding surface is precisely transferred to the preform for press molding having been softened by heating. According to this means, grinding and polishing of optically functional surfaces are unnecessary. That is, the optical element can be produced solely by press molding. The press molding is performed in an inert atmosphere like in nitrogen gas. Here, when a preform for press molding having an additional weight relative to the final molded article is used, for example, in the case of a lens, centering maybe performed by grinding by the amount corresponding to the additional weight.

Second means is that press molding is performed using a preform for polish having a shape which is similar to the shape of the optical element serving as a final molded article and which is larger than the optical element. The formed press molded article contains optically functional surfaces, and the surfaces of the optical element are formed by machining. In the press molded article, in order that breakage that could be caused by the machining should be avoided in the glass, residual strain need be minimized. Further, also in order that required optical indices should be achieved, an appropriate annealing treatment is necessary. According to this means, press molding may be performed in an ordinary atmosphere. Further, the above-mentioned mold-releasing agent may be used.

Here, in both cases regardless of whether the first means or the second means described above is selected, the refractive index (nd) and the Abbe number (vd) of the obtained optical element varies slightly owing to the heat history in the producing process. Thus, when an optical element having precisely specified optical indices is to be produced, component adjustment for the optical glass composition, heat history adjustment in the producing process, adjustment of incorporating the amount of variation into the optical design when necessary, or the like may be selected appropriately with taking into consideration the above-mentioned variation in the refractive index (nd) and the Abbe number (vd). As a result, an optical element is obtained that has desired optical indices and an excellent transmissivity and that is particularly suitable as an optical component of a device which incorporates a solid-state image sensor or the like.

Embodiment II-1

First, an optical glass composition according to Embodiment II-1 of the present invention is described below in detail. This optical glass composition has the following composition.

That is, the optical glass composition according to the present Embodiment II-1 contains, in % by weight, 1.0% or more and 12.0% or less of $SiO_2$, 8.0% or more and 18.0% or less of $B_2O_3$, 0% or more and 6.0% or less of ZnO, 1.0% or more and 10.0% or less of $ZrO_2$, 25.0% or more and 47.0% or less of $La_2O_3$, 0% or more and 5.0% or less of $R_2O$ (here, R is at least one of Li, Na and K), 0% or more and 15.0% or less of BaO, 0% or more and 15.0% or less of $Nb_2O_5$, 0% or more and 7.0% or less of $TiO_2$, 0% or more and 15.0% or less of $Ta_2O_5$, 2.0% or more of $Nb_2O_5+TiO_2+Ta_2O_5$, 0% or more and 20.0% or less of $Gd_2O_3$, 0.5% or more and 10.0% or less of $WO_3$ and 10.0% or more and 16.0% or less of $Nb_2O_5+WO_3$. From this optical glass composition, more stable optical glass is obtained that has a refractive index (nd) to the d-line of 1.88 or higher and 1.92 or lower and an Abbe number (vd) to the d-line of 33 or higher and 37 or lower.

Next, the individual components contained in the optical glass composition are described below in detail. Hereinafter, the contents of the individual components are expressed in % by weight.

$SiO_2$ serves as a component for composing a network, and is an essential component for improving devitrification resistance. Nevertheless, when the amount of $SiO_2$ exceeds 12.0%, its solubility becomes poor, and hence difficulty arises in stable preparing. Further, its liquidus temperature goes high, and hence difficulty arises in preparing. In contrast, when the amount of $SiO_2$ is less than 1.0%, the devitrification resistance becomes poor, and hence the glass becomes unstable. A preferable amount of $SiO_2$ is 1.0% or more and 10.5% or less, and a more preferable amount is 3.0% or more and 8.5% or less.

$B_2O_3$ serves as a component for composing a network, and has the effect of lowering a temperature range necessary for ensuring a desired melting property and a desired viscous flow. Nevertheless, when the amount of $B_2O_3$ exceeds 18.0%, the refractive index becomes excessively low. In contrast, when the amount of $B_2O_3$ is less than 8.0%, the temperature range necessary for ensuring a desired melting property and a desired fluidity becomes excessively high. A preferable amount of $B_2O_3$ is 8.5% or more and 18.0% or less, and a more preferable amount is 9.5% or more and 16.0% or less.

ZnO has the effects of improving the devitrification resistance and lowering the temperature necessary for viscous flow. When the amount of ZnO falls outside a range of 0% or more and 6.0% or less, difficulty arises in adjusting the refractive index (nd) and the Abbe number (vd) into desired ranges. A preferable amount of ZnO is 2.0% or more and 6.0% or less.

$ZrO_2$ has the effects of improving the refractive index and also improving the devitrification resistance. When the amount of $ZrO_2$ is less than 1.0%, the effect of improving the refractive index decreases. In contrast, when the amount of $ZrO_2$ exceeds 10.0%, the devitrification resistance becomes poor and so does the solubility. A preferable amount of $ZrO_2$ is 2.0% or more and 9.0% or less.

$La_2O_3$ improves the refractive index, and is one of the most important components that control the Abbe number. When the amount of $La_2O_3$ is less than 25.0%, difficulty arises in adjusting the Abbe number into a desired range. In contrast, when the amount of $La_2O_3$ exceeds 47.0%, the devitrification resistance becomes poor. Thus, glass becomes unstable, and hence difficulty arises in preparing. A preferable amount of $La_2O_3$ is 26.5% or more and 45.0% or less.

$R_2O$ (here, R is at least one of Li, Na and K) has the effect of lowering glass transition temperature (denoted by Tg, hereinafter) so as to improve the melting property. In particular, $Li_2O$ is the most effective. Nevertheless, when an excessive amount of $R_2O$ is used, remarkable degradation arises in the devitrification resistance and the refractive index. Thus, the amount of $R_2O$ is set to be 0% or more and 5.0% or less and, preferably, 0% or more and 3.0% or less. Here, in order that Tg should be lowered so that the effect of improving the melting property should be achieved more successfully, it is preferable that the amount of $R_2O$ is 0.5% or more.

BaO is a component that improves preparing property. Nevertheless, when an excessive amount of BaO is used, the devitrification resistance becomes poor. Thus, the amount of BaO is set to be 0% or more and 15.0% or less and, preferably, 1.0% or more and 14.0% or less.

Here, alkali earth metal oxides R'O (here, R' is at least one of Sr, Ca and Mg) other than the BaO have a tendency that when an excessive amount is used, the devitrification resistance becomes poor. Thus, non-use of these is preferable. Accordingly, when the use of R'O is unavoidable, their total amount is set to be 0% or more and 15% or less.

Similarly to $La_2O_3$, $Nb_2O_5$ improves the refractive index, and is one of the components that control the Abbe number. Further, when $La_2O_3$ is replaced by $Nb_2O_5$, the effect of improving the devitrification resistance is also obtained. Nevertheless, when an excessive amount of $Nb_2O_5$ is used, difficulty arises in adjusting the Abbe number into a desired range. Thus, the amount of $Nb_2O_5$ is set to be 0% or more and 15.0% or less and, preferably, 0% or more and 14.5% or less. Here, in order that the effect of improving the refractive index and the devitrification resistance should be achieved more successfully, it is preferable that the amount of $Nb_2O_5$ is 0.5% or more.

$TiO_2$ has the effects of controlling the refractive index and the Abbe number and improving the devitrification resistance. Nevertheless, when an excessive amount of $TiO_2$ is used, difficulty arises in adjusting the Abbe number into a desired range. Thus, the amount of $TiO_2$ is set to be 0% or more and 7.0% or less and, preferably, 0% or more and 5.0% or less. Here, in order that the effect of improving the refractive index and the devitrification resistance should be achieved more successfully, it is preferable that the amount of $TiO_2$ is 0.5% or more.

Similarly to $La_2O_3$, $Ta_2O_5$ improves the refractive index, and is one of the components that control the Abbe number. Nevertheless, when an excessive amount of $Ta_2O_5$ is used, the melting property becomes poor, and hence difficulty arises in preparing. Thus, the amount of $Ta_2O_5$ is set to be 0% or more and 15.0% or less and, preferably, 0% ormore and 10.5% or less. Here, in order that the effect of improving the refractive index should be achieved more successfully, it is preferable that the amount of $Ta_2O_5$ is 0.5% or more.

Here, in order that high devitrification caused by $La_2O_3$ should be alleviated and that the refractive index and the Abbe number should be adjusted into desired ranges, it is preferable that at least one of the above-mentioned $Nb_2O_5$, $TiO_2$ and $Ta_2O_5$ is used. Specifically, the total amount of $Nb_2O_5$, $TiO_2$ and $Ta_2O_5$ ($Nb_2O_5+TiO_2+Ta_2O_5$) is adjusted into 2.0% or more and, preferably, into 10.0% or more. Here, when the total amount is excessive, this can cause possibilities that difficulty arises in adjusting the Abbe number into a desired range and that the melting property becomes poor and hence difficulty arises in preparing. Thus, it is preferable that the total amount is adjusted into 30.0% or less.

Similarly to $La_2O_3$, $Gd_2O_3$ improves the refractive index, and is one of the components that control the Abbe number. Nevertheless, when an excessive amount of $Gd_2O_3$ is used, the devitrification resistance becomes poor. Thus, glass becomes unstable, and hence difficulty arises in preparing. Thus, the amount of $Gd_2O_3$ is set to be 0% or more and 20.0% or less and, preferably, 0% or more and 18.0% or less. Here, in order that the effect of improving the refractive index should be achieved more successfully, it is preferable that the amount of $Gd_2O_3$ is 0.5% or more.

$WO_3$ is a component for alleviating the high devitrification caused by $La_2O_3$ and adjusting the refractive index and the Abbe number into desired ranges. Nevertheless, when the amount of $WO_3$ exceeds 10.0%, the transmissivity in a blue light range becomes poor. In contrast, when the amount of $WO_3$ is less than 0.5%, the effect of improving the devitrification is not achieved. A preferable amount of $WO_3$ is 3.0% or more and 7.0% or less.

Here, in order that the refractive index and the Abbe number should be adjusted into desired ranges, the total amount of the above-mentioned $Nb_2O_5$ and $WO_3$ ($Nb_2O_5+WO_3$) is 10.0% or more and 16.0% or less and, preferably, 12.0% or more and 15.0% or less.

Similarly to $La_2O_3$, $Y_2O_3$ and $Yb_2O_3$ improve the refractive index, and are components that control the Abbe number. Nevertheless, when an excessive amount of these $Y_2O_3$ and $Yb_2O_3$ is used, the devitrification resistance becomes poor. Thus, glass becomes unstable, and hence difficulty arises in preparing. Thus, when $La_2O_3$ need be replaced by these $Y_2O_3$ and $Yb_2O_3$, the amount of each is set to be 0% or more and 10% or less.

$GeO_2$ may be used as a replacement of $SiO_2$, and serves as a component for composing a network. Thus, $GeO_2$ may be added by up to 12.0%. Nevertheless, when an excessive amount of $GeO_2$ is used, this causes a possibility that the devitrification resistance becomes poor. Thus, it is preferable that the amount of $GeO_2$ is 12.0% or less.

$Al_2O_3$ may be used for adjusting the refractive index. However, it is preferable that the amount is 0% or more and 10% or less. Further, in order to adjust the refractive index, $Ga_2O_3$ and $In_2O_3$ may be used in an amount up to approximately 10% each. Nevertheless, the use of these causes a possibility that the devitrification resistance becomes poor. Thus, it is preferable that these are not used in an excessive amount.

In addition to the above-mentioned components, $Sb_2O_3$ and $SnO_2$ may be used which are generally used as fining agents. Here, it is preferable that the amount of $Sb_2O_3$ and $SnO_2$ is 0% or more and 2% or less each. Nevertheless, $As_2O_3$ having a strong effect as a fining agent is toxic. Thus, it is preferable that $As_2O_3$ is not used.

In addition, as for Pb and its compounds, compounds including Te, Se, or Cd, as well as radioactive substances such as compounds including U or Th, it is preferable that they are not used from the viewpoint of safety. Further, it is also preferable that substances such as compounds including Cu, Cr, V, Fe, Ni or Co that cause coloring are not used.

When the individual components are adjusted into the above-mentioned ratios, an optical glass composition is obtained that has a refractive index (nd) to the d-line of 1.88 or higher and 1.92 or lower and an Abbe number (vd) to the d-line of 33 or higher and 37 or lower.

Here, when the glass is handled in a softened or molten state, from the viewpoints of melting property, processability (droplet property), crystallinity and the like, a lower liquidus temperature is generally preferable in the optical glass. However, in the optical glass composition according to the present Embodiment II-1, lowering the liquidus temperature is not an indispensable condition. That is, even in an optical glass having a high liquidus temperature, it is preferable that a temperature range is selected that permits processing without losing various features of the glass.

Embodiment II-2

Next, a preform according to Embodiment II-2 of the present invention and a producing method for the same are described below in detail. The preform is softened by heating so as to be used at least for press molding. Thus, the weight and the shape of the preform are determined appropriately in accordance with the size and the shape of a press molded article serving as a final target. The preform according to the present Embodiment II-2 is formed from the optical glass composition according to the above-mentioned Embodiment II-1, and hence obtained without losing various features of the optical glass composition in Embodiment II-1.

The preform produced from the optical glass composition according to Embodiment II-1 is described below. Here, the preform is a preliminary glass form that is heated and used for precision press molding. The preforms are divided into a gob preform produced by forming a molten glass material and a polished preform produced by physically polishing a glass material. The optical glass composition according to Embodiment II-1 can be used for both of the gob preform and the polished preform.

The producing method for the preform is described below. First, glass raw materials (the above-mentioned individual components) for the optical glass composition according to the above-mentioned Embodiment II-1 are weighed and prepared, and then processed in processing steps such as dissolution, defoaming, fining and homogenization so that homogeneous molten glass is obtained which contains no foreign substances therein. Then, at the time when the molten glass is caused to flow out through an outflow pipe (referred to as a nozzle, hereinafter) made of platinum alloy or the like, a temperature condition for the vicinity of the nozzle is set up strictly into a range of not causing devitrification in the glass. The molten glass flowing out is cast into a receiving die having a receiving surface of planar shape, concave shape, convex shape or the like or into a molding die in which an enclosure is provided in the circumference of a planar surface, a concave surface or a convex surface. As a result, the molten glass is formed into a desired shape. In the following description, preferable forming methods are illustrated.

A first forming method is one example of producing methods for the gob preform. First, a molten glass lump having a weight corresponding to a final molded article or alternatively a desired weight including an addition necessary for secondary processing into a final molded article is dropped into each of a plurality of receiving dies arranged under the nozzle. Then, cooling is performed simultaneously to the forming of glass lumps so that gob preforms are obtained.

A second forming method is another example of producing methods for the gob preform. The second forming method is suitable for a case that a preform having a relatively heavy weight is to be produced. First, the tip of the molten glass flowing out through the nozzle is brought into contact with the receiving die surface. Then, at each time when a desired weight is reached, the receiving die is rapidly separated from the molten glass so that the molten glass is cut off. As a result, the forming of glass free from striae and shear marks is achieved. Further, when necessary, press molding may be performed with aiming simultaneously at cooling of the molten glass lump, so that a desired shape may be imparted and gob preforms are obtained.

A third forming method is one example of producing methods for the polished preform. First, a glass lump having a desired shape is produced by a similar method to the first and the second forming methods. At this time, the glass lump having a desired shape has a total weight of a desired weight plus an additional weight necessary for finishing all the surfaces including optically functional surfaces of a final product (such as a lens) by means of machining. Then, the glass lump having a desired shape is cut and polished by means of machining so that polished preforms are obtained.

The preform obtained by each of the first and the second forming methods described above can be used as a preform for press molding directly in precision press molding. Further, the third forming method provides a preform for polish. In order that breakage should be avoided in the preform at the time of handling, for example, a three-dimensional cooling method, an optimal cooling rate, an annealing treatment and the like may be selected depending on the shape and the weight.

As described above, a preform for press molding and a preform for polish having a desired weight can be obtained from the optical glass composition according to Embodiment II-1. In the case of a preform for press molding, for the purpose of mold release at the time of forming, it is preferable that the surface roughness of the receiving die surface is adjusted or alternatively that a mold-release film is formed. In the case of a preform for polish, when an HBN (boron-containing mold-releasing agent) is applied, releasing from the die becomes easier. Thus, this approach is preferable.

Embodiment II-3

Next, an optical element according to Embodiment II-3 of the present invention is described below. The optical element according to Embodiment II-3 has optical indices determined by the composition of the optical glass composition according to the above-mentioned Embodiment II-1. That is, the refractive index (nd) to the d-line is 1.88 to 1.92, while the Abbe number (vd) to the d-line is 33 to 37. Further, this optical element has also a feature that optical absorption by coloring is low in a visible light range. The optical element employing the optical glass composition according to Embodiment II-1 is an optical element suitable for an optical system in a digital camera, a video camera, a mobile device or the like.

Examples of the optical element according to the present Embodiment II-3 include a spherical lens, an aspheric lens and a micro lens, as well as a prism and a diffraction grating. Other examples include an optical element cemented with an optical element composed of a glass material or an optical material of another kind.

Next, a producing method for the optical element according to Embodiment II-3 is described below. The optical element according to Embodiment II-3 can be produced by supplying the preform according to the above-mentioned Embodiment II-2 into a molding die, then softening it by heating, then performing press molding, and then performing polish when necessary.

Press molding methods employable for obtaining the optical element are divided into two typical methods. These methods are selected depending on the means of forming optically functional surfaces where light enters and exits.

First means is means referred to as precision press molding. The molding surfaces of a press molding die are precisely processed in advance into reversal shapes of the optically functional surfaces of the optical element serving as a final molded article. Then, when necessary, a mold-release film is provided in order to avoid fusion between the preform and the molding die. Then, press molding is performed so that the shape of the above-mentioned molding surface is precisely transferred to the preform for press molding having been softened by heating. According to this means, grinding and polishing of optically functional surfaces are unnecessary. That is, the optical element can be produced solely by press molding. The press molding is performed in an inert atmosphere like in nitrogen gas. Here, when a preform for press molding having an additional weight relative to the final molded article is used, for example, in the case of a lens, centering maybe performed by grinding by the amount corresponding to the additional weight.

Second means is that press molding is performed using a preform for polish having a shape which is similar to the shape of the optical element serving as a final molded article and which is larger than the optical element. The formed press molded article contains optically functional surfaces, and the surfaces of the optical element are formed by machining. In the press molded article, in order that breakage that could be caused by the machining should be avoided in the glass, residual strain need be minimized. Further, also in order that required optical indices should be achieved, an appropriate annealing treatment is necessary. According to this means, press molding may be performed in an ordinary atmosphere. Further, the above-mentioned mold-releasing agent may be used.

Here, in both cases regardless of whether the first means or the second means described above is selected, the refractive index (nd) and the Abbe number (vd) of the obtained optical element varies slightly owing to the heat history in the producing process. Thus, when an optical element having precisely specified optical indices is to be produced, component adjustment for the optical glass composition, heat history adjustment in the producing process, adjustment of incorporating the amount of variation into the optical design when necessary, or the like may be selected appropriately with taking into consideration the above-mentioned variation in the refractive index (nd) and the Abbe number (vd). As a result, an optical element is obtained that has desired optical indices and an excellent transmissivity and that is particularly suitable as an optical component of a device which incorporates a solid-state image sensor or the like.

Embodiment III-1

First, an optical glass composition according to Embodiment III-1 of the present invention is described below in detail. This optical glass composition has the following composition.

That is, the optical glass composition according to the present Embodiment III-1 contains, in % by weight, 1.0% or more and 12.0% or less of $SiO_2$, 8.0% or more and 18.0% or less of $B_2O_3$, 0% or more and 6.0% or less of ZnO, 1.0% or more and 10.0% or less of $ZrO_2$, 25.0% or more and 47.0% or less of $La_2O_3$, 0.5% or more and 4.0% or less of $Li_2O$, 0% or more and 16.0% or less of $Nb_2O_5$, 0% or more and 7.0% or less of $TiO_2$, 0% or more and 15.0% or less of $Ta_2O_5$, 1.0% or more of $Nb_2O_5+TiO_2+Ta_2O_5$, 0% or more and 26.0% or less of $Gd_2O_3$ and 0% or more and 15.0% or less of $WO_3$. From this optical glass composition, more stable optical glass is obtained that has a refractive index (nd) to the d-line of 1.88 or higher and 1.92 or lower, an Abbe number (vd) to the d-line of 33 or higher and 37 or lower and a yield temperature of 700° C. or lower.

Next, the individual components contained in the optical glass composition are described below in detail. Hereinafter, the contents of the individual components are expressed in % by weight.

$SiO_2$ serves as a component for composing a network, and is an essential component for improving devitrification resistance. Nevertheless, when the amount of $SiO_2$ exceeds 12.0%, its solubility becomes poor, and hence difficulty arises in stable preparing. Further, its liquidus temperature goes high, and hence difficulty arises in preparing. In contrast, when the amount of $SiO_2$ is less than 1.0%, the devitrification resistance becomes poor, and hence the glass becomes unstable. A preferable amount of $SiO_2$ is 1.0% or more and 10.5% or less, and a more preferable amount is 3.0% or more and 8.5% or less.

$B_2O_3$ serves as a component for composing a network, and has the effect of lowering a temperature range necessary for ensuring a desired melting property and a desired viscous flow. Nevertheless, when the amount of $B_2O_3$ exceeds 18.0%, the refractive index becomes excessively low. In contrast, when the amount of $B_2O_3$ is less than 8.0%, the temperature range necessary for ensuring a desired melting property and a desired fluidity becomes excessively high. A preferable amount of $B_2O_3$ is 8.5% or more and 18.0% or less, and a more preferable amount is 9.5% or more and 16.0% or less.

ZnO has the effects of improving the devitrification resistance and lowering the temperature necessary for viscous flow. When the amount of ZnO falls outside a range of 0% or more and 6.0% or less, difficulty arises in adjusting the refractive index (nd) and the Abbe number (vd) into desired ranges. A preferable amount of ZnO is 2.0% or more and 6.0% or less.

$ZrO_2$ has the effects of improving the refractive index and also improving the devitrification resistance. When the amount of $ZrO_2$ is less than 1.0%, the effect of improving the refractive index decreases. In contrast, when the amount of $ZrO_2$ exceeds 10.0%, the devitrification resistance becomes poor and so does the solubility. A preferable amount of $ZrO_2$ is 2.0% or more and 9.0% or less.

$La_2O_3$ improves the refractive index, and is one of the most important components that control the Abbe number. When the amount of $La_2O_3$ is less than 25.0%, difficulty arises in adjusting the Abbe number into a desired range. In contrast, when the amount of $La_2O_3$ exceeds 47.0%, the devitrification resistance becomes poor. Thus, glass becomes unstable, and hence difficulty arises in preparing. A preferable amount of $La_2O_3$ is 26.5% or more and 45.0% or less.

$Li_2O$ has the effect of lowering glass transition temperature (denoted by Tg, hereinafter) so as to improve the melting property. Nevertheless, when an excessive amount of $Li_2O$ is used, remarkable degradation arises in the devitrification resistance and the refractive index. Thus, the amount of $Li_2O$ is set to be 4.0% or less and, preferably, 3.0% or less. Here, in order that Tg should be lowered so that the effect of improving the melting property should be achieved more successfully, the amount of $Li_2O$ is set to be 0.5% or more and, preferably, 1.0% or more. Further, when alkali metal oxides $R_2O$ (here, R is at least one of Na and K) other than $Li_2O$ are used, this causes a possibility that the devitrification resistance and the refractive index become remarkably poor. Thus, non-use of $R_2O$ is preferable.

Similarly to $La_2O_3$, $Nb_2O_5$ improves the refractive index, and is one of the components that control the Abbe number. Further, when $La_2O_3$ is replaced by $Nb_2O_5$, the effect of improving the devitrification resistance is also obtained. Nevertheless, when an excessive amount of $Nb_2O_5$ is used, difficulty arises in adjusting the Abbe number into a desired range. Thus, the amount of $Nb_2O_5$ is set to be 0% or more and 16.0% or less and, preferably, 0% or more and 14.5% or less. Here, in order that the effect of improving the refractive index and the devitrification resistance should be achieved more successfully, it is preferable that the amount of $Nb_2O_5$ is 0.5% or more.

$TiO_2$ has the effects of controlling the refractive index and the Abbe number and improving the devitrification resistance. Nevertheless, when an excessive amount of $TiO_2$ is used, difficulty arises in adjusting the Abbe number into a desired range. Thus, the amount of $TiO_2$ is set to be 0% or more and 7.0% or less and, preferably, 0% or more and 5.0% or less. Here, in order that the effect of improving the refractive index and the devitrification resistance should be achieved more successfully, it is preferable that the amount of $TiO_2$ is 0.5% or more.

Similarly to $La_2O_3$, $Ta_2O_5$ improves the refractive index, and is one of the components that control the Abbe number. Nevertheless, when an excessive amount of $Ta_2O_5$ is used, the melting property becomes poor, and hence difficulty arises in preparing. Thus, the amount of $Ta_2O_5$ is set to be 0% or more and 15.0% or less and, preferably, 0% or more and 10.5% or less. Here, in order that the effect of improving the refractive index should be achieved more successfully, it is preferable that the amount of $Ta_2O_5$ is 0.5% or more.

Here, in order that high devitrification caused by $La_2O_3$ should be alleviated and that the refractive index and the Abbe number should be adjusted into desired ranges, it is preferable that at least one of the above-mentioned $Nb_2O_5$, $TiO_2$ and $Ta_2O_5$ is used. Specifically, the total amount of $Nb_2O_5$, $TiO_2$ and $Ta_2O_5$ ($Nb_2O_5+TiO_2+Ta_2O_5$) is adjusted into 1.0% or more and, preferably, into 10.0% or more. Here, when the total amount is excessive, this can cause possibilities that difficulty arises in adjusting the Abbe number into a desired range and that the melting property becomes poor and hence difficulty arises in preparing. Thus, it is preferable that the total amount is adjusted into 30.0% or less.

Similarly to $La_2O_3$, $Gd_2O_3$ improves the refractive index, and is one of the components that control the Abbe number. Nevertheless, when an excessive amount of $Gd_2O_3$ is used, the devitrification resistance becomes poor. Thus, glass becomes unstable, and hence difficulty arises in preparing. Thus, the amount of $Gd_2O_3$ is set to be 0% or more and 26.0% or less and, preferably, 0% or more and 20.0% or less. Here, in order that the effect of improving the refractive index should be achieved more successfully, it is preferable that the amount of $Gd_2O_3$ is 0.5% or more.

$WO_3$ is a component for alleviating the high devitrification caused by $La_2O_3$ and adjusting the refractive index and the Abbe number into desired ranges. Nevertheless, when an excessive amount of $WO_3$ is used, the transmissivity in a blue light range becomes poor. Thus, the amount of $WO_3$ is set to be 0% or more and 15.0% or less and, preferably, 0% or more and 13.0% or less. Here, in order that the effect of alleviating the high devitrification caused by $La_2O_3$ and adjusting the refractive index and the Abbe number into desired ranges should be achieved more successfully, it is preferable that the amount of $WO_3$ is 0.5% or more.

BaO is a component that improves preparing property, but has a tendency of degrading the devitrification resistance, and hence is not indispensable. Thus, BaO may be used in the amount of 0% or more and 14.0% or less. Here, alkali earth metal oxides R'O (here, R' is at least one of Ba, Sr, Ca and Mg) including the BaO have a tendency that when an excessive amount is used, the devitrification resistance becomes poor. Thus, non-use of these is preferable. Accordingly, when the use of R'O is unavoidable, their total amount is set to be 0% or more and 14% or less.

Similarly to $La_2O_3$, $Y_2O_3$ and $Yb_2O_3$ improve the refractive index, and are components that control the Abbe number. Nevertheless, when an excessive amount of these $Y_2O_3$ and $Yb_2O_3$ is used, the devitrification resistance becomes poor. Thus, glass becomes unstable, and hence difficulty arises in preparing. Thus, when $La_2O_3$ need be replaced by these $Y_2O_3$ and $Yb_2O_3$, the amount of each is set to be 0% or more and 10% or less.

$GeO_2$ may be used as a replacement of $SiO_2$, and serves as a component for composing a network. Thus, $GeO_2$ may be added by up to 12.0%. Nevertheless, when an excessive amount of $GeO_2$ is used, this causes a possibility that the devitrification resistance becomes poor. Thus, it is preferable that the amount of $GeO_2$ is 12.0% or less.

$Al_2O_3$ may be used for adjusting the refractive index. However, it is preferable that the amount is 0% or more and 10% or less. Further, in order to adjust the refractive index, $Ga_2O_3$ and $In_2O_3$ may be used in an amount up to approximately 10% each. Nevertheless, the use of these causes a possibility that the devitrification resistance becomes poor. Thus, it is preferable that these are not used in an excessive amount.

In addition to the above-mentioned components, $Sb_2O_3$ and $SnO_2$ may be used which are generally used as fining agents. Here, it is preferable that the amount of $Sb_2O_3$ and $SnO_2$ is 0% or more and 2% or less each. Nevertheless, $As_2O_3$ having a strong effect as a fining agent is toxic. Thus, it is preferable that $As_2O_3$ is not used.

In addition, as for Pb and its compounds, compounds including Te, Se, or Cd, as well as radioactive substances such as compounds including U or Th, it is preferable that they are not used from the viewpoint of safety. Further, it is also preferable that substances such as compounds including Cu, Cr, V, Fe, Ni or Co that cause coloring are not used.

When the individual components are adjusted into the above-mentioned ratios, an optical glass composition is obtained that has a refractive index (nd) to the d-line of 1.88 or higher and 1.92 or lower, an Abbe number (vd) to the d-line of 33 or higher and 37 or lower and a yield temperature of 700° C. or lower.

Here, when the glass is handled in a softened or molten state, from the viewpoints of melting property, processability (droplet property), crystallinity and the like, a lower liquidus temperature is generally preferable in the optical glass. However, in the optical glass composition according to the present Embodiment III-1, lowering the liquidus temperature is not an indispensable condition. That is, even in an optical glass having a high liquidus temperature, it is preferable that a temperature range is selected that permits processing without losing various features of the glass.

Embodiment III-2

Next, a preform according to Embodiment III-2 of the present invention and a producing method for the same are described below in detail. The preform is softened by heating so as to be used at least for press molding. Thus, the weight and the shape of the preform are determined appropriately in accordance with the size and the shape of a press molded article serving as a final target. The preform according to the present Embodiment III-2 is formed from the optical glass composition according to the above-mentioned Embodiment III-1, and hence obtained without losing various features of the optical glass composition in Embodiment III-1.

The preform produced from the optical glass composition according to Embodiment III-1 is described below. Here, the preform is a preliminary glass form that is heated and used for precision press molding. The preforms are divided into a gob preform produced by forming a molten glass material and a polished preform produced by physically polishing a glass material. The optical glass composition according to Embodiment III-1 can be used for both of the gob preform and the polished preform.

The producing method for the preform is described below. First, glass raw materials (the above-mentioned individual components) for the optical glass composition according to the above-mentioned Embodiment III-1 are weighed and prepared, and then processed in processing steps such as dissolution, defoaming, fining and homogenization so that homogeneous molten glass is obtained which contains no foreign substances therein. Then, at the time when the molten glass is caused to flow out through an outflow pipe (referred to as a nozzle, hereinafter) made of platinum alloy or the like, a temperature condition for the vicinity of the nozzle is set up strictly into a range of not causing devitrification in the glass. The molten glass flowing out is cast into a receiving die having a receiving surface of planar shape, concave shape, convex shape or the like or into a molding die in which an enclosure is provided in the circumference of a planar surface, a concave surface or a convex surface. As a result, the molten glass is formed into a desired shape. In the following description, preferable forming methods are illustrated.

A first forming method is one example of producing methods for the gob preform. First, a molten glass lump having a weight corresponding to a final molded article or alternatively a desired weight including an addition necessary for secondary processing into a final molded article is dropped into each of a plurality of receiving dies arranged under the nozzle. Then, cooling is performed simultaneously to the forming of glass lumps so that gob preforms are obtained.

A second forming method is another example of producing methods for the gob preform. The second forming method is suitable for a case that a preform having a relatively heavy weight is to be produced. First, the tip of the molten glass flowing out through the nozzle is brought into contact with the receiving die surface. Then, at each time when a desired weight is reached, the receiving die is rapidly separated from the molten glass so that the molten glass is cut off. As a result, the forming of glass free from striae and shear marks is achieved. Further, when necessary, press molding may be performed with aiming simultaneously at cooling of the molten glass lump, so that a desired shape may be imparted and gob preforms are obtained.

A third forming method is one example of producing methods for the polished preform. First, a glass lump having a desired shape is produced by a similar method to the first and the second forming methods. At this time, the glass lump having a desired shape has a total weight of a desired weight plus an additional weight necessary for finishing all the surfaces including optically functional surfaces of a final product (such as a lens) by means of machining. Then, the glass lump having a desired shape is cut and polished by means of machining so that polished preforms are obtained.

The preform obtained by each of the first and the second forming methods described above can be used as a preform for press molding directly in precision press molding. Further, the third forming method provides a preform for polish. In order that breakage should be avoided in the preform at the time of handling, for example, a three-dimensional cooling method, an optimal cooling rate, an annealing treatment and the like may be selected depending on the shape and the weight.

As described above, a preform for press molding and a preform for polish having a desired weight can be obtained from the optical glass composition according to Embodiment III-1. In the case of a preform for press molding, for the purpose of mold release at the time of forming, it is preferable that the surface roughness of the receiving die surface is adjusted or alternatively that a mold-release film is formed. In the case of a preform for polish, when an HBN (boron-containing mold-releasing agent) is applied, releasing from the die becomes easier. Thus, this approach is preferable.

Embodiment III-3

Next, an optical element according to Embodiment III-3 of the present invention is described below. The optical element according to Embodiment III-3 has optical indices determined by the composition of the optical glass composition according to the above-mentioned Embodiment III-1. That is, the refractive index (nd) to the d-line is 1.88 to 1.92, while the Abbe number (vd) to the d-line is 33 to 37, and while the yield temperature is 700° C. or lower. Further, this optical element has also a feature that optical absorption by coloring is low in a visible light range. The optical element employing the optical glass composition according to Embodiment III-1 is an optical element suitable for an optical system in a digital camera, a video camera, a mobile device or the like.

Examples of the optical element according to the present Embodiment III-3 include a spherical lens, an aspheric lens and a micro lens, as well as a prism and a diffraction grating. Other examples include an optical element cemented with an optical element composed of a glass material or an optical material of another kind.

Next, a producing method for the optical element according to Embodiment III-3 is described below. The optical element according to Embodiment III-3 can be produced by supplying the preform according to the above-mentioned Embodiment III-2 into a molding die, then softening it by heating, then performing the receiving die is rapidly separated from the molten glass so that the molten glass is cut off. As a result, the forming of glass free from striae and shear marks is achieved. Further, when necessary, press molding may be performed with aiming simultaneously at cooling of the molten glass lump, so that a desired shape may be imparted and gob preforms are obtained.

A third forming method is one example of producing methods for the polished preform. First, a glass lump having a desired shape is produced by a similar method to the first and the second forming methods. At this time, the glass lump having a desired shape has a total weight of a desired weight plus an additional weight necessary for finishing all the surfaces including optically functional surfaces of a final product (such as a lens) by means of machining. Then, the glass lump having a desired shape is cut and polished by means of machining so that polished preforms are obtained.

The preform obtained by each of the first and the second forming methods described above can be used as a preform for press molding directly in precision press molding. Further, the third forming method provides a preform for polish. In order that breakage should be avoided in the preform at the time of handling, for example, a three-dimensional cooling method, an optimal cooling rate, an annealing treatment and the like may be selected depending on the shape and the weight.

As described above, a preform for press molding and a press molding, and then performing polish when necessary.

Press molding methods employable for obtaining the optical element are divided into two typical methods. These methods are selected depending on the means of forming optically functional surfaces where light enters and exits.

First means is means referred to as precision press molding. The molding surfaces of a press molding die are precisely processed in advance into reversal shapes of the optically functional surfaces of the optical element serving as a final molded article. Then, when necessary, a mold-release film is provided in order to avoid fusion between the preform and the molding die. Then, press molding is performed so that the shape of the above-mentioned molding surface is precisely transferred to the preform for press molding having been softened by heating. According to this means, grinding and polishing of optically functional surfaces are unnecessary. That is, the optical element can be produced solely by press molding. The press molding is performed in an inert atmosphere like in nitrogen gas. Here, when a preform for press molding having an additional weight relative to the final molded article is used, for example, in the case of a lens, centering maybe performed by grinding by the amount corresponding to the additional weight.

Second means is that press molding is performed using a preform for polish having a shape which is similar to the shape of the optical element serving as a final molded article and which is larger than the optical element. The formed press molded article contains optically functional surfaces, and the surfaces of the optical element are formed by machining. In the press molded article, in order that breakage that could be caused by the machining should be avoided in the glass, residual strain need be minimized. Further, also in order that required optical indices should be achieved, an appropriate annealing treatment is necessary. According to this means, press molding may be performed in an ordinary atmosphere. Further, the above-mentioned mold-releasing agent may be used.

Here, in both cases regardless of whether the first means or the second means described above is selected, the refractive index (nd) and the Abbe number (vd) of the obtained optical element varies slightly owing to the heat history in the producing process. Thus, when an optical element having precisely specified optical indices is to be produced, component adjustment for the optical glass composition, heat history adjustment in the producing process, adjustment of incorporating the amount of variation into the optical design when necessary, or the like may be selected appropriately with taking into consideration the above-mentioned variation in the refractive index (nd) and the Abbe number (vd). As a result, an optical element is obtained that has desired optical indices and an excellent transmissivity and that is particularly suitable as an optical component of a device which incorporates a solid-state image sensor or the like.

Embodiment IV-1

First, an optical glass composition according to Embodiment IV-1 of the present invention is described below in detail. This optical glass composition has the following composition.

That is, the optical glass composition according to the present Embodiment IV-1 contains, in % by weight, 1.0% or more and 12.0% or less of $SiO_2$, 8.5% or more and 18.0% or less of $B_2O_3$, 0% or more and 6.0% or less of ZnO, 1.0% or more and 10.0% or less of $ZrO_2$, 25.0% or more and 47.0% or less of $La_2O_3$, 0% or more and 5.0% or less of $R_2O$ (here, R is at least one of Li, Na and K), 0% or more and 16.0% or less of $Nb_2O_5$, 0% or more and 7.0% or less of $TiO_2$, 0% or more and 15.0% or less of $Ta_2O_5$, 1.0% or more of $Nb_2O_5+TiO_2+Ta_2O_5$, 0% or more and 26.0% or less of $Gd_2O_3$ and 0% or more and 13.0% or less of $WO_3$, and substantially does not contain R'O (here, R' is at least one of Ba, Sr, Ca and Mg). From this optical glass composition, more stable optical glass is obtained that has a refractive index (nd) to the d-line of 1.88 or higher and 1.92 or lower and an Abbe number (vd) to the d-line of 33 or higher and 37 or lower.

Next, the individual components contained in the optical glass composition are described below in detail. Hereinafter, the contents of the individual components are expressed in % by weight.

$SiO_2$ serves as a component for composing a network, and is an essential component for improving devitrification resistance. Nevertheless, when the amount of $SiO_2$ exceeds 12.0%, its solubility becomes poor, and hence difficulty arises in stable preparing. Further, its liquidus temperature goes high, and hence difficulty arises in preparing. In contrast, when the amount of $SiO_2$ is less than 1.0%, the devitrification resistance becomes poor, and hence the glass becomes unstable. A preferable amount of $SiO_2$ is 1.0% or more and 10.5% or less, and a more preferable amount is 3.0% or more and 8.5% or less.

$B_2O_3$ serves as a component for composing a network, and has the effect of lowering a temperature range necessary for ensuring a desired melting property and a desired viscous flow. Nevertheless, when the amount of $B_2O_3$ exceeds 18.0%, the refractive index becomes excessively low. In contrast, when the amount of $B_2O_3$ is less than 8.5%, the temperature range necessary for ensuring a desired melting property and a desired fluidity becomes excessively high. A preferable amount of $B_2O_3$ is 9.5% or more and 16.0% or less.

ZnO has the effects of improving the devitrification resistance and lowering the temperature necessary for viscous flow. When the amount of ZnO falls outside a range of 0% or more and 6.0% or less, difficulty arises in adjusting the refractive index (nd) and the Abbe number (vd) into desired ranges. A preferable amount of ZnO is 2.0% or more and 6.0% or less.

$ZrO_2$ has the effects of improving the refractive index and also improving the devitrification resistance. When the amount of $ZrO_2$ is less than 1.0%, the effect of improving the refractive index decreases. In contrast, when the amount of $ZrO_2$ exceeds 10.0%, the devitrification resistance becomes poor and so does the solubility. A preferable amount of $ZrO_2$ is 2.0% or more and 9.0% or less.

$La_2O_3$ improves the refractive index, and is one of the most important components that control the Abbe number. When the amount of $La_2O_3$ is less than 25.0%, difficulty arises in adjusting the Abbe number into a desired range. In contrast, when the amount of $La_2O_3$ exceeds 47.0%, the devitrification resistance becomes poor. Thus, glass becomes unstable, and hence difficulty arises in preparing. A preferable amount of $La_2O_3$ is 26.5% or more and 45.0% or less.

$R_2O$ (here, R is at least one of Li, Na and K) has the effect of lowering glass transition temperature (denoted by Tg, hereinafter) so as to improve the melting property. In particular, $Li_2O$ is the most effective. Nevertheless, when an excessive amount of $R_2O$ is used, remarkable degradation arises in the devitrification resistance and the refractive index. Thus, the amount of $R_2O$ is set to be 0% or more and 5.0% or less and, preferably, 0% or more and 3.0% or less. Here, in order that Tg should be lowered so that the effect of improving the melting property should be achieved more successfully, it is preferable that the amount of $R_{20}$ is 0.5% or more.

Similarly to $La_2O_3$, $Nb_2O_5$ improves the refractive index, and is one of the components that control the Abbe number. Further, when $La_2O_3$ is replaced by $Nb_2O_5$, the effect of improving the devitrification resistance is also obtained. Nevertheless, when an excessive amount of $Nb_2O_5$ is used, difficulty arises in adjusting the Abbe number into a desired range. Thus, the amount of $Nb_2O_5$ is set to be 0% or more and 16.0% or less and, preferably, 0% or more and 14.5% or less. Here, in order that the effect of improving the refractive index and the devitrification resistance should be achieved more successfully, it is preferable that the amount of $Nb_2O_5$ is 0.5% or more.

$TiO_2$ has the effects of controlling the refractive index and the Abbe number and improving the devitrification resistance. Nevertheless, when an excessive amount of $TiO_2$ is used, difficulty arises in adjusting the Abbe number into a desired range. Thus, the amount of $TiO_2$ is set to be 0% or more and 7.0% or less and, preferably, 0% or more and 5.0% or less. Here, in order that the effect of improving the refractive index and the devitrification resistance should be achieved more successfully, it is preferable that the amount of $TiO_2$ is 0.5% or more.

Similarly to $La_2O_3$, $Ta_2O_5$ improves the refractive index, and is one of the components that control the Abbe number. Nevertheless, when an excessive amount of $Ta_2O_5$ is used, the melting property becomes poor, and hence difficulty arises in preparing. Thus, the amount of $Ta_2O_5$ is set to be 0% or more and 15.0% or less and, preferably, 0% or more and 10.5% or less. Here, in order that the effect of improving the refractive index should be achieved more successfully, it is preferable that the amount of $Ta_2O_5$ is 0.5% or more.

Here, in order that high devitrification caused by $La_2O_3$ should be alleviated and that the refractive index and the Abbe number should be adjusted into desired ranges, it is preferable that at least one of the above-mentioned $Nb_2O_5$, $TiO_2$ and $Ta_2O_5$ is used. Specifically, the total amount of $Nb_2O_5$, $TiO_2$ and $Ta_2O_5$ ($Nb_2O_5+TiO_2+Ta_2O_5$) is adjusted into 1.0% or more and, preferably, into 10.0% or more. Here, when the total amount is excessive, this can cause possibilities that difficulty arises in adjusting the Abbe number into a desired range and that the melting property becomes poor and hence difficulty arises in preparing. Thus, it is preferable that the total amount is adjusted into 30.0% or less.

Similarly to $La_2O_3$, $Gd_2O_3$ improves the refractive index, and is one of the components that control the Abbe number. Nevertheless, when an excessive amount of $Gd_2O_3$ is used, the devitrification resistance becomes poor. Thus, glass becomes unstable, and hence difficulty arises in preparing. Thus, the amount of $Gd_2O_3$ is set to be 0% or more and 26.0% or less and, preferably, 0% or more and 20.0% or less. Here, in order that the effect of improving the refractive index should be achieved more successfully, it is preferable that the amount of $Gd_2O_3$ is 0.5% or more.

$WO_3$ is a component for alleviating the high devitrification caused by $La_2O_3$ and adjusting the refractive index and the Abbe number into desired ranges. Nevertheless, when an excessive amount of $WO_3$ is used, the transmissivity in a blue light range becomes poor. Thus, the amount of $WO_3$ is set to be 0% or more and 13.0% or less and, preferably, 0% or more and 10.0% or less. Here, in order that the effect of alleviating the high devitrification caused by $La_2O_3$ and adjusting the refractive index and the Abbe number into desired ranges should be achieved more successfully, it is preferable that the amount of $WO_3$ is 0.5% or more.

R'O (here, R' is at least one of Ba, Sr, Ca and Mg) causes degradation in the devitrification resistance and causes the refractive index and the Abbe number to deviate from the desired ranges, and hence is not contained substantially.

Similarly to $La_2O_3$, $Y_2O_3$ and $Yb_2O_3$ improve the refractive index, and are components that control the Abbe number. Nevertheless, when an excessive amount of these $Y_2O_3$ and $Yb_2O_3$ is used, the devitrification resistance becomes poor. Thus, glass becomes unstable, and hence difficulty arises in preparing. Thus, when $La_2O_3$ need be replaced by these $Y_2O_3$ and $Yb_2O_3$, the amount of each is set to be 0% or more and 10% or less.

$GeO_2$ may be used as a replacement of $SiO_2$, and serves as a component for composing a network. Thus, $GeO_2$ may be added by up to 12.0%. Nevertheless, when an excessive amount of $GeO_2$ is used, this causes a possibility that the devitrification resistance becomes poor. Thus, it is preferable that the amount of $GeO_2$ is 12.0% or less.

$Al_2O_3$ may be used for adjusting the refractive index. However, it is preferable that the amount is 0% or more and 10% or less. Further, in order to adjust the refractive index, $Ga_2O_3$ and $In_2O_3$ may be used in an amount up to approximately 10% each. Nevertheless, the use of these causes a possibility that the devitrification resistance becomes poor. Thus, it is preferable that these are not used in an excessive amount.

In addition to the above-mentioned components, $Sb_2O_3$ and $SnO_2$ may be used which are generally used as fining agents. Here, it is preferable that the amount of $Sb_2O_3$ and $SnO_2$ is 0% or more and 2% or less each. Nevertheless, $As_2O_3$ having a strong effect as a fining agent is toxic. Thus, it is preferable that $As_2O_3$ is not used.

In addition, as for Pb and its compounds, compounds including Te, Se, or Cd, as well as radioactive substances such as compounds including U or Th, it is preferable that they are not used from the viewpoint of safety. Further, it is also preferable that substances such as compounds including Cu, Cr, V, Fe, Ni or Co that cause coloring are not used.

When the individual components are adjusted into the above-mentioned ratios, an optical glass composition is obtained that has a refractive index (nd) to the d-line of 1.88 or higher and 1.92 or lower and an Abbe number (vd) to the d-line of 33 or higher and 37 or lower.

Here, when the glass is handled in a softened or molten state, from the viewpoints of melting property, processability (droplet property), crystallinity and the like, a lower liquidus temperature is generally preferable in the optical glass. However, in the optical glass composition according to the present Embodiment IV-1, lowering the liquidus temperature is not an indispensable condition. That is, even in an optical glass having a high liquidus temperature, it is preferable that a temperature range is selected that permits processing without losing various features of the glass.

Embodiment IV-2

Next, a preform according to Embodiment IV-2 of the present invention and a producing method for the same are described below in detail. The preform is softened by heating so as to be used at least for press molding. Thus, the weight and the shape of the preform are determined appropriately in accordance with the size and the shape of a press molded article serving as a final target. The preform according to the present Embodiment IV-2 is formed from the optical glass composition according to the above-mentioned Embodiment IV-1, and hence obtained without losing various features of the optical glass composition in Embodiment IV-1.

The preform produced from the optical glass composition according to Embodiment IV-1 is described below. Here, the preform is a preliminary glass form that is heated and used for precision press molding. The preforms are divided into a gob preform produced by forming a molten glass material and a polished preform produced by physically polishing a glass material. The optical glass composition according to Embodiment IV-1 can be used for both of the gob preform and the polished preform.

The producing method for the preform is described below. First, glass raw materials (the above-mentioned individual components) for the optical glass composition according to the above-mentioned Embodiment IV-1 are weighed and prepared, and then processed in processing steps such as dissolution, defoaming, fining and homogenization so that homogeneous molten glass is obtained which contains no foreign substances therein. Then, at the time when the molten glass is caused to flow out through an outflow pipe (referred to as a nozzle, hereinafter) made of platinum alloy or the like, a temperature condition for the vicinity of the nozzle is set up strictly into a range of not causing devitrification in the glass. The molten glass flowing out is cast into a receiving die having a receiving surface of planar shape, concave shape, convex shape or the like or into a molding die in which an enclosure is provided in the circumference of a planar surface, a concave surface or a convex surface. As a result, the molten glass is formed into a desired shape. In the following description, preferable forming methods are illustrated.

A first forming method is one example of producing methods for the gob preform. First, a molten glass lump having a weight corresponding to a final molded article or alternatively a desired weight including an addition necessary for secondary processing into a final molded article is dropped into each of a plurality of receiving dies arranged under the nozzle. Then, cooling is performed simultaneously to the forming of glass lumps so that gob preforms are obtained.

A second forming method is another example of producing methods for the gob preform. The second forming method is suitable for a case that a preform having a relatively heavy weight is to be produced. First, the tip of the molten glass flowing out through the nozzle is brought into contact with the receiving die surface. Then, at each time when a desired weight is reached, the receiving die is rapidly separated from the molten glass so that the molten glass is cut off. As a result, the forming of glass free from striae and shear marks is achieved. Further, when necessary, press molding may be performed with aiming simultaneously at cooling of the molten glass lump, so that a desired shape may be imparted and gob preforms are obtained.

A third forming method is one example of producing methods for the polished preform. First, a glass lump having a desired shape is produced by a similar method to the first and the second forming methods. At this time, the glass lump having a desired shape has a total weight of a desired weight plus an additional weight necessary for finishing all the surfaces including optically functional surfaces of a final product (such as a lens) by means of machining. Then, the glass lump having a desired shape is cut and polished by means of machining so that polished preforms are obtained.

The preform obtained by each of the first and the second forming methods described above can be used as a preform for press molding directly in precision press molding. Further, the third forming method provides a preform for polish. In order that breakage should be avoided in the preform at the time of handling, for example, a three-dimensional cooling method, an optimal cooling rate, an annealing treatment and the like may be selected depending on the shape and the weight.

As described above, a preform for press molding and a preform for polish having a desired weight can be obtained from the optical glass composition according to Embodiment IV-1. In the case of a preform for press molding, for the purpose of mold release at the time of forming, it is preferable that the surface roughness of the receiving die surface is adjusted or alternatively that a mold-release film is formed. In the case of a preform for polish, when an HBN (boron-containing mold-releasing agent) is applied, releasing from the die becomes easier. Thus, this approach is preferable.

Embodiment IV-3

Next, an optical element according to Embodiment IV-3 of the present invention is described below. The optical element according to Embodiment IV-3 has optical indices determined by the composition of the optical glass composition according to the above-mentioned Embodiment IV-1. That is, the refractive index (nd) to the d-line is 1.88 to 1.92, while the Abbe number (vd) to the d-line is 33 to 37. Further, this optical element has also a feature that optical absorption by coloring is low in a visible light range. The optical element employing the optical glass composition according to Embodiment IV-1 is an optical element suitable for an optical system in a digital camera, a video camera, a mobile device or the like.

Examples of the optical element according to the present Embodiment IV-3 include a spherical lens, an aspheric lens and a micro lens, as well as a prism and a diffraction grating. Other examples include an optical element cemented with an optical element composed of a glass material or an optical material of another kind.

Next, a producing method for the optical element according to Embodiment IV-3 is described below. The optical element according to Embodiment IV-3 can be produced by supplying the preform according to the above-mentioned Embodiment IV-2 into a molding die, then softening it by heating, then performing press molding, and then performing polish when necessary.

Press molding methods employable for obtaining the optical element are divided into two typical methods. These methods are selected depending on the means of forming optically functional surfaces where light enters and exits.

First means is means referred to as precision press molding. The molding surfaces of a press molding die are precisely processed in advance into reversal shapes of the optically functional surfaces of the optical element serving as a final molded article. Then, when necessary, a mold-release film is provided in order to avoid fusion between the preform and the molding die. Then, press molding is performed so that the shape of the above-mentioned molding surface is precisely transferred to the preform for press molding having been softened by heating. According to this means, grinding and polishing of optically functional surfaces are unnecessary. That is, the optical element can be produced solely by press molding. The press molding is performed in an inert atmosphere like in nitrogen gas. Here, when a preform for press molding having an additional weight relative to the final molded article is used, for example, in the case of a lens, centering maybe performed by grinding by the amount corresponding to the additional weight.

Second means is that press molding is performed using a preform for polish having a shape which is similar to the shape of the optical element serving as a final molded article and which is larger than the optical element. The formed press molded article contains optically functional surfaces, and the surfaces of the optical element are formed by machining. In the press molded article, in order that breakage that could be caused by the machining should be avoided in the glass, residual strain need be minimized. Further, also in order that required optical indices should be achieved, an appropriate annealing treatment is necessary. According to this means, press molding may be performed in an ordinary atmosphere. Further, the above-mentioned mold-releasing agent may be used.

Here, in both cases regardless of whether the first means or the second means described above is selected, the refractive index (nd) and the Abbe number (vd) of the obtained optical element varies slightly owing to the heat history in the producing process. Thus, when an optical element having precisely specified optical indices is to be produced, component adjustment for the optical glass composition, heat history adjustment in the producing process, adjustment of incorporating the amount of variation into the optical design when necessary, or the like may be selected appropriately with taking into consideration the above-mentioned variation in the refractive index (nd) and the Abbe number (vd). As a result, an optical element is obtained that has desired optical indices and an excellent transmissivity and that is particularly suitable as an optical component of a device which incorporates a solid-state image sensor or the like.

EXAMPLES

Next, the embodiments of the present invention are described below in further detail with reference to the following examples. However, the embodiments are not limited to these examples.

Operation in the examples and comparative examples was as follows. First, raw material mixture composed of predetermined amounts of oxides and carbonates was put into a platinum crucible. Then, the raw material mixture was melted at 1350° C. to 1450° C. for 1 hour with stirring it intermittently. After that, the melt was caused to flow into a molding die having been heated in advance, then held for 1 hour in an electric furnace set at a temperature higher than the expected Tg, and then cooled in the furnace at a cooling rate of 30° C./hour, so that an optical glass lump was obtained. After that, using polished samples cut out from the optical glass lump, the refractive index (nd) and the dispersion (vd: Abbe number) were measured in all of the examples and comparative examples. Further, in Examples III-1 to III-40 and Comparative Examples III-1 to III-2, the glass transition temperature (Tg), the glass yield temperature (At) and the linear expansion coefficient ($\alpha$) were also measured. The compositions (component ratios) of the glass in the examples and the comparative examples are shown in the following tables.

In the tables, the following points are to be noted.

(1) The component ratios in the composition fields in each table are expressed in % by weight calculated from batch materials.

(2) The "nd" and the "vd" indicate respectively the refractive index and the Abbe number at room temperature.

(3) The "Tg" and the "At" indicate respectively the glass transition temperature and the glass yield temperature obtained from a thermal expansion curve measured with rising a temperature at a rate of 5° C./min by using a thermodilatometer.

(4) The "$\alpha$" indicates the linear expansion coefficient between 100° C. and 300° C. obtained from the thermal expansion curve measured in the above-mentioned (3).

TABLE I-1

| Component | Example | | | | | | | |
|---|---|---|---|---|---|---|---|---|
| (% by weight) | I-1 | I-2 | I-3 | I-4 | I-5 | I-6 | I-7 | I-8 |
| $SiO_2$ | 7.2 | 7.2 | 7.2 | 7.2 | 7.2 | 7.2 | 7.2 | 8.0 |
| $B_2O_3$ | 12.0 | 11.5 | 11.5 | 12.5 | 10.0 | 10.5 | 10.5 | 10.7 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.0 | 1.5 | 1.5 | 0.5 | 3.0 | 1.5 | 1.5 | 1.5 |
| ZnO | 2.0 | 2.0 | 2.0 | 2.0 | 2.0 | 3.0 | 3.0 | 2.0 |
| BaO | 0.0 | 0.0 | 0.0 | 0.0 | 0.0 | 0.0 | 0.0 | 0.0 |
| $ZrO_2$ | 6.0 | 8.0 | 8.0 | 8.0 | 8.0 | 10.0 | 4.0 | 8.0 |
| $La_2O_3$ | 36.8 | 36.8 | 46.8 | 36.8 | 36.8 | 34.8 | 38.8 | 36.8 |
| $Nb_2O_5$ | 12.0 | 8.5 | 9.0 | 8.5 | 8.5 | 8.5 | 8.5 | 8.5 |
| $TiO_2$ | 0.0 | 2.0 | 2.0 | 2.0 | 2.0 | 2.0 | 2.0 | 2.0 |
| $Ta_2O_5$ | 10.5 | 6.0 | 6.0 | 6.0 | 6.0 | 6.0 | 6.0 | 6.0 |
| $Gd_2O_3$ | 5.0 | 10.0 | 0.0 | 10.0 | 10.0 | 10.0 | 12.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |

TABLE I-1-continued

| Component (% by weight) | Example | | | | | | | |
|---|---|---|---|---|---|---|---|---|
| | I-1 | I-2 | I-3 | I-4 | I-5 | I-6 | I-7 | I-8 |
| $WO_3$ | 7.5 | 6.5 | 6.0 | 6.5 | 6.5 | 6.5 | 6.5 | 6.5 |
| $WO_3 + Gd_2O_3$ | 12.5 | 16.5 | 6.0 | 16.5 | 16.5 | 16.5 | 18.5 | 16.5 |
| nd | 1.89360 | 1.89462 | 1.90108 | 1.89206 | 1.89120 | 1.89555 | 1.89495 | 1.89555 |
| vd | 34.8 | 35.1 | 35.5 | 35.0 | 35.8 | 35.3 | 35.0 | 35.3 |

TABLE I-2

| Component (% by weight) | Example | | | | | | | |
|---|---|---|---|---|---|---|---|---|
| | I-9 | I-10 | I-11 | I-12 | I-13 | I-14 | I-15 | I-16 |
| $SiO_2$ | 5.0 | 7.2 | 7.2 | 7.2 | 7.2 | 7.2 | 7.2 | 8.0 |
| $B_2O_3$ | 13.7 | 11.5 | 11.5 | 11.5 | 11.5 | 11.5 | 11.5 | 12.7 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.5 | 1.5 | 1.5 | 1.5 | 1.5 | 1.5 | 1.5 | 0.5 |
| ZnO | 2.0 | 2.0 | 2.0 | 2.0 | 2.0 | 2.0 | 2.0 | 3.0 |
| BaO | 0.0 | 0.0 | 0.0 | 0.0 | 0.0 | 0.0 | 0.0 | 0.0 |
| $ZrO_2$ | 8.0 | 8.0 | 8.0 | 8.0 | 8.0 | 8.0 | 8.0 | 8.0 |
| $La_2O_3$ | 36.8 | 46.8 | 46.3 | 26.8 | 26.8 | 33.8 | 31.8 | 35.8 |
| $Nb_2O_5$ | 8.5 | 14.5 | 14.5 | 9.0 | 9.0 | 0.0 | 0.0 | 8.5 |
| $TiO_2$ | 2.0 | 2.0 | 2.0 | 2.0 | 2.0 | 5.0 | 7.0 | 2.0 |
| $Ta_2O_5$ | 6.0 | 6.0 | 6.0 | 6.0 | 6.0 | 6.0 | 6.0 | 6.0 |
| $Gd_2O_3$ | 10.0 | 0.0 | 0.5 | 25.5 | 13.0 | 15.0 | 15.0 | 9.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 6.5 | 0.5 | 0.5 | 0.5 | 13.0 | 10.0 | 10.0 | 6.5 |
| $WO_3 + Gd_2O_3$ | 16.5 | 0.5 | 1.0 | 26.0 | 26.0 | 25.0 | 25.0 | 15.5 |
| nd | 1.89495 | 1.90727 | 1.91241 | 1.88890 | 1.89574 | 1.89031 | 1.89894 | 1.88848 |
| vd | 35.0 | 33.6 | 34.5 | 36.8 | 33.3 | 34.9 | 33.1 | 35.4 |

TABLE I-3

| Component (% by weight) | Example | | | | | | | |
|---|---|---|---|---|---|---|---|---|
| | I-17 | I-18 | I-19 | I-20 | I-21 | I-22 | I-23 | I-24 |
| $SiO_2$ | 8.0 | 7.2 | 7.2 | 7.2 | 7.2 | 7.2 | 7.2 | 8.2 |
| $B_2O_3$ | 9.7 | 10.5 | 10.5 | 11.5 | 11.5 | 11.5 | 11.5 | 10.5 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 0.5 | 1.5 | 1.5 | 1.5 | 1.5 | 1.5 | 1.5 | 1.5 |
| ZnO | 6.0 | 3.0 | 3.0 | 2.0 | 2.0 | 2.0 | 2.0 | 2.0 |
| BaO | 0.0 | 0.0 | 0.0 | 0.0 | 0.0 | 0.0 | 0.0 | 0.0 |
| $ZrO_2$ | 8.0 | 2.0 | 1.0 | 8.0 | 8.0 | 8.0 | 8.0 | 9.0 |
| $La_2O_3$ | 35.8 | 42.8 | 43.8 | 36.8 | 36.8 | 36.8 | 36.8 | 37.3 |
| $Nb_2O_5$ | 8.5 | 8.5 | 8.5 | 8.5 | 8.5 | 8.5 | 8.5 | 9.5 |
| $TiO_2$ | 2.0 | 2.0 | 2.0 | 2.0 | 2.0 | 2.0 | 2.0 | 2.0 |
| $Ta_2O_5$ | 6.0 | 6.0 | 6.0 | 0.0 | 1.0 | 10.0 | 15.0 | 6.5 |
| $Gd_2O_3$ | 9.0 | 10.0 | 10.0 | 16.0 | 15.0 | 6.0 | 1.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 6.5 | 6.5 | 6.5 | 6.5 | 6.5 | 6.5 | 6.5 | 3.5 |
| $WO_3 + Gd_2O_3$ | 15.5 | 16.5 | 16.5 | 22.5 | 21.5 | 12.5 | 7.5 | 13.5 |
| nd | 1.90942 | 1.89458 | 1.89260 | 1.88960 | 1.89047 | 1.89913 | 1.90213 | 1.89759 |
| vd | 34.4 | 36.0 | 36.0 | 36.4 | 36.1 | 34.6 | 33.6 | 35.2 |

TABLE I-4

| Component (% by weight) | Example | | | | | | | |
|---|---|---|---|---|---|---|---|---|
| | I-25 | I-26 | I-27 | I-28 | I-29 | I-30 | I-31 | I-32 |
| $SiO_2$ | 8.2 | 8.2 | 8.2 | 10.2 | 3.0 | 1.0 | 7.2 | 7.2 |
| $B_2O_3$ | 10.5 | 10.5 | 10.5 | 8.5 | 15.7 | 17.7 | 13.0 | 12.5 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |

TABLE I-4-continued

| Component (% by weight) | Example | | | | | | | |
|---|---|---|---|---|---|---|---|---|
| | I-25 | I-26 | I-27 | I-28 | I-29 | I-30 | I-31 | I-32 |
| $Na_2O$ | 0.0 | 0.0 | 0.0 | 0.0 | 0.0 | 0.0 | 0.0 | 0.5 |
| $Li_2O$ | 1.5 | 1.5 | 1.5 | 1.5 | 1.5 | 1.5 | 0.0 | 0.0 |
| ZnO | 2.0 | 2.0 | 2.0 | 2.0 | 2.0 | 2.0 | 2.0 | 2.0 |
| BaO | 0.0 | 0.0 | 0.0 | 0.0 | 0.0 | 0.0 | 0.0 | 0.0 |
| $ZrO_2$ | 9.0 | 9.0 | 9.0 | 9.0 | 9.0 | 9.0 | 8.0 | 8.0 |
| $La_2O_3$ | 42.3 | 44.3 | 44.3 | 37.3 | 37.3 | 37.3 | 36.8 | 36.8 |
| $Nb_2O_5$ | 9.0 | 8.5 | 8.3 | 9.5 | 9.5 | 9.5 | 8.5 | 8.5 |
| $TiO_2$ | 2.0 | 2.0 | 2.2 | 2.0 | 2.0 | 2.0 | 2.0 | 2.0 |
| $Ta_2O_5$ | 6.5 | 6.5 | 6.5 | 6.5 | 6.5 | 6.5 | 6.0 | 6.0 |
| $Gd_2O_3$ | 5.0 | 3.0 | 3.0 | 10.0 | 10.0 | 10.0 | 10.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 4.0 | 4.5 | 4.5 | 3.5 | 3.5 | 3.5 | 6.5 | 6.5 |
| $WO_3 + Gd_2O_3$ | 9.0 | 7.5 | 7.5 | 13.5 | 13.5 | 13.5 | 16.5 | 16.5 |
| nd | 1.89865 | 1.89745 | 1.89906 | 1.89719 | 1.89903 | 1.89998 | 1.89686 | 1.89190 |
| vd | 35.9 | 35.6 | 35.5 | 34.6 | 35.5 | 35.6 | 35.3 | 35.2 |

TABLE I-5

| Component (% by weight) | Example | | | | | | | |
|---|---|---|---|---|---|---|---|---|
| | I-33 | I-34 | I-35 | I-36 | I-37 | I-38 | I-39 | I-40 |
| $SiO_2$ | 7.2 | 7.2 | 7.2 | 7.2 | 7.2 | 7.2 | 7.2 | 7.2 |
| $B_2O_3$ | 11.5 | 11.5 | 10.0 | 13.0 | 11.5 | 11.5 | 11.0 | 10.0 |
| $GeO_2$ | 0.0 | 0.0 | 0.0 | 0.0 | 2.0 | 4.0 | 0.0 | 0.0 |
| $K_2O$ | 0.0 | 1.5 | 3.0 | 0.0 | 0.0 | 0.0 | 0.0 | 0.0 |
| $Na_2O$ | 1.5 | 0.0 | 0.0 | 0.0 | 0.0 | 0.0 | 2.0 | 3.0 |
| $Li_2O$ | 0.0 | 0.0 | 0.0 | 0.0 | 1.5 | 1.5 | 0.0 | 0.0 |
| ZnO | 2.0 | 2.0 | 2.0 | 2.0 | 2.0 | 2.0 | 2.0 | 2.0 |
| BaO | 0.0 | 0.0 | 0.0 | 0.0 | 0.0 | 0.0 | 0.0 | 0.0 |
| $ZrO_2$ | 8.0 | 8.0 | 8.0 | 8.0 | 8.0 | 8.0 | 8.0 | 8.0 |
| $La_2O_3$ | 36.8 | 36.8 | 36.8 | 36.8 | 34.8 | 32.8 | 36.8 | 36.8 |
| $Nb_2O_5$ | 8.5 | 8.5 | 8.5 | 8.5 | 8.5 | 8.5 | 8.5 | 8.5 |
| $TiO_2$ | 2.0 | 2.0 | 2.0 | 2.0 | 2.0 | 2.0 | 2.0 | 2.0 |
| $Ta_2O_5$ | 6.0 | 6.0 | 6.0 | 6.0 | 6.0 | 6.0 | 6.0 | 6.0 |
| $Gd_2O_3$ | 10.0 | 10.0 | 10.0 | 10.0 | 10.0 | 10.0 | 10.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 6.5 | 6.5 | 6.5 | 6.5 | 6.5 | 6.5 | 6.5 | 6.5 |
| $WO_3 + Gd_2O_3$ | 16.5 | 16.5 | 16.5 | 16.5 | 16.5 | 16.5 | 16.5 | 16.5 |
| nd | 1.89090 | 1.89288 | 1.89585 | 1.89686 | 1.88801 | 1.88166 | 1.89143 | 1.88700 |
| vd | 35.3 | 34.8 | 34.6 | 35.3 | 35.1 | 35.2 | 36.6 | 37.0 |

TABLE I-6

| Component (% by weight) | Example | | | | | | | |
|---|---|---|---|---|---|---|---|---|
| | I-41 | I-42 | I-43 | I-44 | I-45 | I-46 | I-47 | I-48 |
| $SiO_2$ | 7.2 | 6.2 | 6.2 | 5.2 | 3.2 | 3.2 | 8.2 | 8.2 |
| $B_2O_3$ | 10.5 | 10.5 | 10.5 | 11.5 | 11.5 | 11.5 | 10.5 | 10.5 |
| $GeO_2$ | 0.0 | 0.0 | 0.0 | 2.0 | 8.0 | 12.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.5 | 1.5 | 1.5 | 1.5 | 1.5 | 1.5 | 1.5 | 1.5 |
| ZnO | 2.0 | 0.0 | 0.0 | 2.0 | 2.0 | 2.0 | 2.0 | 2.0 |
| BaO | 1.0 | 8.0 | 14.0 | 0.0 | 0.0 | 0.0 | 0.0 | 0.0 |
| $ZrO_2$ | 9.0 | 8.0 | 7.0 | 8.0 | 8.0 | 8.0 | 9.0 | 9.0 |
| $La_2O_3$ | 44.3 | 41.3 | 36.3 | 36.8 | 32.8 | 28.8 | 41.8 | 41.3 |
| $Nb_2O_5$ | 8.3 | 8.3 | 8.3 | 8.5 | 8.5 | 8.5 | 9.0 | 9.0 |
| $TiO_2$ | 2.2 | 2.2 | 2.2 | 2.0 | 2.0 | 2.0 | 2.0 | 2.0 |
| $Ta_2O_5$ | 6.5 | 6.5 | 6.5 | 10.0 | 10.0 | 10.0 | 6.5 | 6.5 |
| $Gd_2O_3$ | 3.0 | 3.0 | 3.0 | 6.0 | 6.0 | 6.0 | 5.0 | 5.0 |
| $Y_2O_3$ | 0.0 | 0.0 | 0.0 | 0.0 | 0.0 | 0.0 | 0.5 | 1.0 |
| $Yb_2O_3$ | 0.0 | 0.0 | 0.0 | 0.0 | 0.0 | 0.0 | 0.0 | 0.0 |
| $WO_3$ | 4.5 | 4.5 | 4.5 | 6.5 | 6.5 | 6.5 | 4.0 | 4.0 |
| $WO_3 + Gd_2O_3$ | 7.5 | 7.5 | 7.5 | 12.5 | 12.5 | 12.5 | 9.0 | 9.0 |
| nd | 1.90705 | 1.89674 | 1.88098 | 1.90839 | 1.90759 | 1.89364 | 1.89892 | 1.89927 |
| vd | 36.1 | 35.9 | 35.5 | 34.1 | 33.9 | 33.9 | 35.5 | 35.5 |

TABLE I-7

| Component (% by weight) | Example | | | | | |
|---|---|---|---|---|---|---|
| | I-49 | I-50 | I-51 | I-52 | I-53 | I-54 |
| $SiO_2$ | 8.2 | 8.2 | 8.2 | 8.2 | 8.2 | 8.2 |
| $B_2O_3$ | 10.5 | 10.5 | 10.5 | 10.5 | 10.5 | 10.5 |
| $GeO_2$ | 0.0 | 0.0 | 0.0 | 0.0 | 0.0 | 0.0 |
| $K_2O$ | 0.0 | 0.0 | 0.0 | 0.0 | 0.0 | 0.0 |
| $Na_2O$ | 0.0 | 0.0 | 0.0 | 0.0 | 0.0 | 0.0 |
| $Li_2O$ | 1.5 | 1.5 | 1.5 | 1.5 | 1.5 | 1.5 |
| ZnO | 2.0 | 2.0 | 2.0 | 2.0 | 2.0 | 2.0 |
| BaO | 0.0 | 0.0 | 0.0 | 0.0 | 0.0 | 0.0 |
| $ZrO_2$ | 9.0 | 9.0 | 9.0 | 9.0 | 9.0 | 9.0 |
| $La_2O_3$ | 40.3 | 38.3 | 41.8 | 41.3 | 40.3 | 38.3 |
| $Nb_2O_5$ | 9.0 | 9.0 | 9.0 | 9.0 | 9.0 | 9.0 |
| $TiO_2$ | 2.0 | 2.0 | 2.0 | 2.0 | 2.0 | 2.0 |
| $Ta_2O_5$ | 6.5 | 6.5 | 6.5 | 6.5 | 6.5 | 6.5 |
| $Gd_2O_3$ | 5.0 | 5.0 | 5.0 | 5.0 | 5.0 | 5.0 |
| $Y_2O_3$ | 2.0 | 4.0 | 0.0 | 0.0 | 0.0 | 0.0 |
| $Yb_2O_3$ | 0.0 | 0.0 | 0.5 | 1.0 | 2.0 | 4.0 |
| $WO_3$ | 4.0 | 4.0 | 4.0 | 4.0 | 4.0 | 4.0 |
| $WO_3 + Gd_2O_3$ | 9.0 | 9.0 | 9.0 | 9.0 | 9.0 | 9.0 |
| nd | 1.89869 | 1.89677 | 1.89979 | 1.89854 | 1.89979 | 1.89658 |
| vd | 35.5 | 35.6 | 35.5 | 35.6 | 35.3 | 35.7 |

TABLE I-8

| Component (% by weight) | Comparative Example | | | | | | | |
|---|---|---|---|---|---|---|---|---|
| | I-1 | I-2 | I-3 | I-4 | I-5 | I-6 | I-7 | I-8 |
| $SiO_2$ | 7.2 | 7.2 | 6.6 | 6.6 | 6.6 | 6.5 | 10.0 | 6.0 |
| $B_2O_3$ | 11.5 | 11.5 | 13.2 | 13.2 | 13.1 | 10.5 | 13.0 | 8.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.5 | 1.5 | 0.0 | 0.0 | 0.0 | 0.0 | 0.0 | 0.0 |
| ZnO | 2.0 | 2.0 | 7.2 | 7.1 | 2.7 | 3.0 | 3.0 | 2.5 |
| BaO | 0.0 | 0.0 | 21.9 | 16.9 | 18.4 | 16.0 | 17.0 | 15.5 |
| $ZrO_2$ | 8.0 | 8.0 | 5.7 | 7.1 | 4.3 | 7.0 | 7.0 | 6.5 |
| $La_2O_3$ | 26.8 | 26.8 | 19.0 | 36.2 | 35.9 | 34.0 | 37.0 | 34.0 |
| $Nb_2O_5$ | 9.0 | 9.0 | 21.6 | 3.9 | 6.8 | 7.0 | 4.0 | 8.5 |
| $TiO_2$ | 2.0 | 2.0 | 3.9 | 9.0 | 12.4 | 16.0 | 9.0 | 19.0 |
| $Ta_2O_5$ | 6.0 | 6.0 | 0.0 | 0.0 | 0.0 | 0.0 | 0.0 | 0.0 |
| $Gd_2O_3$ | 26.0 | 10.0 | 0.0 | 0.0 | 0.0 | 0.0 | 0.0 | 0.0 |
| $WO_3$ | 0.0 | 16.0 | 0.3 | 0.0 | 0.0 | 0.0 | 0.0 | 0.0 |
| $WO_3 + Gd_2O_3$ | 26.0 | 26.0 | 0.3 | 0.0 | 0.0 | 0.0 | 0.0 | 0.0 |
| nd | 1.88638 | 1.89654 | 1.87410 | 1.87247 | 1.89803 | 1.94875 | 1.85403 | 1.99450 |
| vd | 37.2 | 32.6 | 31.3 | 34.2 | 31.4 | 28.3 | 35.0 | 25.9 |

TABLE I-9

| Component (% by weight) | Comparative Example | | | |
|---|---|---|---|---|
| | I-9 | I-10 | I-11 | I-12 |
| $SiO_2$ | 6.3 | 0.0 | 6.6 | 6.0 |
| $B_2O_3$ | 12.7 | 23.0 | 13.2 | 8.0 |
| $K_2O$ | 0.0 | 0.0 | 0.0 | 0.0 |
| $Na_2O$ | 0.0 | 0.0 | 0.0 | 0.0 |
| $Li_2O$ | 0.0 | 0.0 | 0.0 | 0.0 |
| ZnO | 2.5 | 5.0 | 2.7 | 2.0 |
| BaO | 31.4 | 0.0 | 16.8 | 15.0 |
| $ZrO_2$ | 6.5 | 5.0 | 5.7 | 6.5 |
| $La_2O_3$ | 33.6 | 40.0 | 36.2 | 34.0 |
| $Nb_2O_5$ | 2.0 | 17.0 | 5.4 | 8.0 |
| $TiO_2$ | 5.0 | 5.0 | 13.4 | 20.5 |
| $Ta_2O_5$ | 0.0 | 5.0 | 0.0 | 0.0 |
| $Gd_2O_3$ | 0.0 | 0.0 | 0.0 | 0.0 |
| $WO_3$ | 0.0 | 0.0 | 0.0 | 0.0 |
| $WO_3 + Gd_2O_3$ | 0.0 | 0.0 | 0.0 | 0.0 |
| nd | 1.82546 | 1.90564 | 1.90047 | 2.00030 |
| vd | 38.6 | 31.7 | 30.7 | 25.5 |

As seen from Tables I-1 to I-7 given above, the optical glass composition according to each of Examples I-1 to I-54 has a refractive index (nd) to the d-line falling within a high refractive index range of 1.88 or higher and 1.92 or lower and yet has an Abbe number (vd) to the d-line falling within a range of 33 or higher and 37 or lower.

TABLE II-1

| Component (% by weight) | Example | | | | | | | |
|---|---|---|---|---|---|---|---|---|
| | II-1 | II-2 | II-3 | II-4 | II-5 | II-6 | II-7 | II-8 |
| $SiO_2$ | 7.2 | 7.2 | 7.2 | 7.2 | 7.2 | 7.2 | 7.2 | 8.0 |
| $B_2O_3$ | 11.5 | 11.5 | 11.5 | 12.5 | 10.0 | 10.5 | 10.5 | 10.7 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.5 | 1.5 | 1.5 | 0.5 | 3.0 | 1.5 | 1.5 | 1.5 |
| ZnO | 2.0 | 2.0 | 2.0 | 2.0 | 2.0 | 3.0 | 3.0 | 2.0 |
| BaO | 0.0 | 0.0 | 0.0 | 0.0 | 0.0 | 0.0 | 0.0 | 0.0 |
| $ZrO_2$ | 8.0 | 8.0 | 8.0 | 8.0 | 8.0 | 10.0 | 4.0 | 8.0 |
| $La_2O_3$ | 36.8 | 26.8 | 46.8 | 36.8 | 36.8 | 34.8 | 38.8 | 36.8 |
| $Nb_2O_5$ | 8.5 | 8.5 | 9.0 | 8.5 | 8.5 | 8.5 | 8.5 | 8.5 |
| $TiO_2$ | 2.0 | 2.0 | 2.0 | 2.0 | 2.0 | 2.0 | 2.0 | 2.0 |
| $Ta_2O_5$ | 6.0 | 6.0 | 6.0 | 6.0 | 6.0 | 6.0 | 6.0 | 6.0 |
| $Gd_2O_3$ | 10.0 | 20.0 | 0.0 | 10.0 | 10.0 | 10.0 | 12.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 6.5 | 6.5 | 6.0 | 6.5 | 6.5 | 6.5 | 6.5 | 6.5 |
| $WO_3 + Nb_2O_5$ | 15.0 | 15.0 | 15.0 | 15.0 | 15.0 | 15.0 | 15.0 | 15.0 |
| nd | 1.89462 | 1.88983 | 1.90108 | 1.89206 | 1.89120 | 1.89555 | 1.89495 | 1.89555 |
| vd | 35.1 | 35.3 | 35.5 | 35.0 | 35.8 | 35.3 | 35.0 | 35.3 |

TABLE II-2

| Component (% by weight) | Example | | | | | | | |
|---|---|---|---|---|---|---|---|---|
| | II-9 | II-10 | II-11 | II-12 | II-13 | II-14 | II-15 | II-16 |
| $SiO_2$ | 5.0 | 7.2 | 7.2 | 7.2 | 7.2 | 8.0 | 8.0 | 7.2 |
| $B_2O_3$ | 13.7 | 11.5 | 11.5 | 11.5 | 11.5 | 12.7 | 9.7 | 10.5 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.5 | 1.5 | 1.5 | 1.5 | 1.5 | 0.5 | 0.5 | 1.5 |
| ZnO | 2.0 | 2.0 | 2.0 | 2.0 | 2.0 | 3.0 | 6.0 | 3.0 |
| BaO | 0.0 | 0.0 | 0.0 | 0.0 | 0.0 | 0.0 | 0.0 | 0.0 |
| $ZrO_2$ | 8.0 | 8.0 | 8.0 | 8.0 | 8.0 | 8.0 | 8.0 | 2.0 |
| $La_2O_3$ | 36.8 | 46.8 | 46.3 | 33.8 | 31.8 | 35.8 | 35.8 | 42.8 |
| $Nb_2O_5$ | 8.5 | 14.5 | 14.5 | 0.0 | 0.0 | 8.5 | 8.5 | 8.5 |
| $TiO_2$ | 2.0 | 2.0 | 2.0 | 5.0 | 7.0 | 2.0 | 2.0 | 2.0 |
| $Ta_2O_5$ | 6.0 | 6.0 | 6.0 | 6.0 | 6.0 | 6.0 | 6.0 | 6.0 |
| $Gd_2O_3$ | 10.0 | 0.0 | 0.5 | 15.0 | 15.0 | 9.0 | 9.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 6.5 | 0.5 | 0.5 | 10.0 | 10.0 | 6.5 | 6.5 | 6.5 |
| $WO_3 + Nb_2O_5$ | 15.0 | 15.0 | 15.0 | 10.0 | 10.0 | 15.0 | 15.0 | 15.0 |
| nd | 1.89495 | 1.90727 | 1.91241 | 1.89031 | 1.89894 | 1.88848 | 1.90942 | 1.89458 |
| vd | 35.0 | 33.6 | 34.5 | 34.9 | 33.1 | 35.4 | 34.4 | 36.0 |

TABLE II-3

| Component (% by weight) | Example | | | | | | | |
|---|---|---|---|---|---|---|---|---|
| | II-17 | II-18 | II-19 | II-20 | II-21 | II-22 | II-23 | II-24 |
| $SiO_2$ | 7.2 | 7.2 | 7.2 | 7.2 | 7.2 | 8.2 | 8.2 | 8.2 |
| $B_2O_3$ | 10.5 | 11.5 | 11.5 | 11.5 | 11.5 | 10.5 | 10.5 | 10.5 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.5 | 1.5 | 1.5 | 1.5 | 1.5 | 1.5 | 1.5 | 1.5 |
| ZnO | 3.0 | 2.0 | 2.0 | 2.0 | 2.0 | 2.0 | 2.0 | 2.0 |
| BaO | 0.0 | 0.0 | 0.0 | 0.0 | 0.0 | 0.0 | 0.0 | 0.0 |
| $ZrO_2$ | 1.0 | 8.0 | 8.0 | 8.0 | 8.0 | 9.0 | 9.0 | 9.0 |
| $La_2O_3$ | 43.8 | 36.8 | 36.8 | 36.8 | 36.8 | 37.3 | 42.3 | 44.3 |
| $Nb_2O_5$ | 8.5 | 8.5 | 8.5 | 8.5 | 8.5 | 9.5 | 9.0 | 8.5 |
| $TiO_2$ | 2.0 | 2.0 | 2.0 | 2.0 | 2.0 | 2.0 | 2.0 | 2.0 |
| $Ta_2O_5$ | 6.0 | 0.0 | 1.0 | 10.0 | 15.0 | 6.5 | 6.5 | 6.5 |
| $Gd_2O_3$ | 10.0 | 16.0 | 15.0 | 6.0 | 1.0 | 10.0 | 5.0 | 3.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 6.5 | 6.5 | 6.5 | 6.5 | 6.5 | 3.5 | 4.0 | 4.5 |

TABLE II-3-continued

| Component (% by weight) | Example | | | | | | | |
|---|---|---|---|---|---|---|---|---|
| | II-17 | II-18 | II-19 | II-20 | II-21 | II-22 | II-23 | II-24 |
| $WO_3 + Nb_2O_5$ | 15.0 | 15.0 | 15.0 | 15.0 | 15.0 | 13.0 | 13.0 | 13.0 |
| nd | 1.89260 | 1.88960 | 1.89047 | 1.89913 | 1.90213 | 1.89759 | 1.89865 | 1.89745 |
| vd | 36.0 | 36.4 | 36.1 | 34.6 | 33.6 | 35.2 | 35.9 | 35.6 |

TABLE II-4

| Component (% by weight) | Example | | | | | | | |
|---|---|---|---|---|---|---|---|---|
| | II-25 | II-26 | II-27 | II-28 | II-29 | II-30 | II-31 | II-32 |
| $SiO_2$ | 8.2 | 10.2 | 3.0 | 1.0 | 7.2 | 7.2 | 7.2 | 7.2 |
| $B_2O_3$ | 10.5 | 8.5 | 15.7 | 17.7 | 13.0 | 12.5 | 11.5 | 11.5 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 1.5 |
| $Na_2O$ | 0.0 | 0.0 | 0.0 | 0.0 | 0.0 | 0.5 | 1.5 | 0.0 |
| $Li_2O$ | 1.5 | 1.5 | 1.5 | 1.5 | 0.0 | 0.0 | 0.0 | 0.0 |
| ZnO | 2.0 | 2.0 | 2.0 | 2.0 | 2.0 | 2.0 | 2.0 | 2.0 |
| BaO | 0.0 | 0.0 | 0.0 | 0.0 | 0.0 | 0.0 | 0.0 | 0.0 |
| $ZrO_2$ | 9.0 | 9.0 | 9.0 | 9.0 | 8.0 | 8.0 | 8.0 | 8.0 |
| $La_2O_3$ | 44.3 | 37.3 | 37.3 | 37.3 | 36.8 | 36.8 | 36.8 | 36.8 |
| $Nb_2O_5$ | 8.3 | 9.5 | 9.5 | 9.5 | 8.5 | 8.5 | 8.5 | 8.5 |
| $TiO_2$ | 2.2 | 2.0 | 2.0 | 2.0 | 2.0 | 2.0 | 2.0 | 2.0 |
| $Ta_2O_5$ | 6.5 | 6.5 | 6.5 | 6.5 | 6.0 | 6.0 | 6.0 | 6.0 |
| $Gd_2O_3$ | 3.0 | 10.0 | 10.0 | 10.0 | 10.0 | 10.0 | 10.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 4.5 | 3.5 | 3.5 | 3.5 | 6.5 | 6.5 | 6.5 | 6.5 |
| $WO_3 + Nb_2O_5$ | 12.8 | 13.0 | 13.0 | 13.0 | 15.0 | 15.0 | 15.0 | 15.0 |
| nd | 1.89906 | 1.89719 | 1.89903 | 1.89998 | 1.89686 | 1.89190 | 1.89090 | 1.89288 |
| vd | 35.5 | 34.6 | 35.5 | 35.6 | 35.3 | 35.2 | 35.3 | 34.8 |

TABLE II-5

| Component (% by weight) | Example | | | | | | | |
|---|---|---|---|---|---|---|---|---|
| | II-33 | II-34 | II-35 | II-36 | II-37 | II-38 | II-39 | II-40 |
| $SiO_2$ | 7.2 | 7.2 | 7.2 | 7.2 | 7.2 | 7.2 | 6.2 | 6.2 |
| $B_2O_3$ | 11.5 | 11.5 | 10.0 | 11.0 | 10.0 | 10.5 | 10.5 | 10.5 |
| $GeO_2$ | 2.0 | 4.0 | 0.0 | 0.0 | 0.0 | 0.0 | 0.0 | 0.0 |
| $K_2O$ | 0.0 | 0.0 | 3.0 | 0.0 | 0.0 | 0.0 | 0.0 | 0.0 |
| $Na_2O$ | 0.0 | 0.0 | 0.0 | 2.0 | 3.0 | 0.0 | 0.0 | 0.0 |
| $Li_2O$ | 1.5 | 1.5 | 0.0 | 0.0 | 0.0 | 1.5 | 1.5 | 1.5 |
| ZnO | 2.0 | 2.0 | 2.0 | 2.0 | 2.0 | 2.0 | 0.0 | 0.0 |
| BaO | 0.0 | 0.0 | 0.0 | 0.0 | 0.0 | 1.0 | 8.0 | 14.0 |
| $ZrO_2$ | 8.0 | 8.0 | 8.0 | 8.0 | 8.0 | 9.0 | 8.0 | 7.0 |
| $La_2O_3$ | 34.8 | 32.8 | 36.8 | 36.8 | 36.8 | 44.3 | 41.3 | 36.3 |
| $Nb_2O_5$ | 8.5 | 8.5 | 8.5 | 8.5 | 8.5 | 8.3 | 8.3 | 8.3 |
| $TiO_2$ | 2.0 | 2.0 | 2.0 | 2.0 | 2.0 | 2.2 | 2.2 | 2.2 |
| $Ta_2O_5$ | 6.0 | 6.0 | 6.0 | 6.0 | 6.0 | 6.5 | 6.5 | 6.5 |
| $Gd_2O_3$ | 10.0 | 10.0 | 10.0 | 10.0 | 10.0 | 3.0 | 3.0 | 3.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 6.5 | 6.5 | 6.5 | 6.5 | 6.5 | 4.5 | 4.5 | 4.5 |
| $WO_3 + Nb_2O_5$ | 15.0 | 15.0 | 15.0 | 15.0 | 15.0 | 12.8 | 12.8 | 12.8 |
| nd | 1.88801 | 1.88166 | 1.89585 | 1.89143 | 1.88700 | 1.90705 | 1.89674 | 1.88098 |
| vd | 35.1 | 35.2 | 34.6 | 36.6 | 37.0 | 36.1 | 35.9 | 35.5 |

TABLE II-6

| Component (% by weight) | Example | | | | | | | |
|---|---|---|---|---|---|---|---|---|
| | II-41 | II-42 | II-43 | II-44 | II-45 | II-46 | II-47 | II-48 |
| $SiO_2$ | 5.2 | 3.2 | 3.2 | 8.2 | 8.2 | 8.2 | 8.2 | 8.2 |
| $B_2O_3$ | 11.5 | 11.5 | 11.5 | 10.5 | 10.5 | 10.5 | 10.5 | 10.5 |
| $GeO_2$ | 2.0 | 8.0 | 12.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |

TABLE II-6-continued

| Component (% by weight) | Example | | | | | | | |
|---|---|---|---|---|---|---|---|---|
| | II-41 | II-42 | II-43 | II-44 | II-45 | II-46 | II-47 | II-48 |
| $Na_2O$ | 0.0 | 0.0 | 0.0 | 0.0 | 0.0 | 0.0 | 0.0 | 0.0 |
| $Li_2O$ | 1.5 | 1.5 | 1.5 | 1.5 | 1.5 | 1.5 | 1.5 | 1.5 |
| ZnO | 2.0 | 2.0 | 2.0 | 2.0 | 2.0 | 2.0 | 2.0 | 2.0 |
| BaO | 0.0 | 0.0 | 0.0 | 0.0 | 0.0 | 0.0 | 0.0 | 0.0 |
| $ZrO_2$ | 8.0 | 8.0 | 8.0 | 9.0 | 9.0 | 9.0 | 9.0 | 9.0 |
| $La_2O_3$ | 36.8 | 32.8 | 28.8 | 41.8 | 41.3 | 40.3 | 38.3 | 41.8 |
| $Nb_2O_5$ | 8.5 | 8.5 | 8.5 | 9.0 | 9.0 | 9.0 | 9.0 | 9.0 |
| $TiO_2$ | 2.0 | 2.0 | 2.0 | 2.0 | 2.0 | 2.0 | 2.0 | 2.0 |
| $Ta_2O_5$ | 10.0 | 10.0 | 10.0 | 6.5 | 6.5 | 6.5 | 6.5 | 6.5 |
| $Gd_2O_3$ | 6.0 | 6.0 | 6.0 | 5.0 | 5.0 | 5.0 | 5.0 | 5.0 |
| $Y_2O_3$ | 0.0 | 0.0 | 0.0 | 0.5 | 1.0 | 2.0 | 4.0 | 0.0 |
| $Yb_2O_3$ | 0.0 | 0.0 | 0.0 | 0.0 | 0.0 | 0.0 | 0.0 | 0.5 |
| $WO_3$ | 6.5 | 6.5 | 6.5 | 4.0 | 4.0 | 4.0 | 4.0 | 4.0 |
| $WO_3 + Nb_2O_5$ | 15.0 | 15.0 | 15.0 | 13.0 | 13.0 | 13.0 | 13.0 | 13.0 |
| nd | 1.90839 | 1.90759 | 1.89364 | 1.89892 | 1.89927 | 1.89869 | 1.89677 | 1.89979 |
| vd | 34.1 | 33.9 | 33.9 | 35.5 | 35.5 | 35.5 | 35.6 | 35.5 |

TABLE II-7

| Component (% by weight) | Example | | |
|---|---|---|---|
| | II-49 | II-50 | II-51 |
| $SiO_2$ | 8.2 | 8.2 | 8.2 |
| $B_2O_3$ | 10.5 | 10.5 | 10.5 |
| $GeO_2$ | 0.0 | 0.0 | 0.0 |
| $K_2O$ | 0.0 | 0.0 | 0.0 |
| $Na_2O$ | 0.0 | 0.0 | 0.0 |
| $Li_2O$ | 1.5 | 1.5 | 1.5 |
| ZnO | 2.0 | 2.0 | 2.0 |
| BaO | 0.0 | 0.0 | 0.0 |
| $ZrO_2$ | 9.0 | 9.0 | 9.0 |
| $La_2O_3$ | 41.3 | 40.3 | 38.3 |
| $Nb_2O_5$ | 9.0 | 9.0 | 9.0 |
| $TiO_2$ | 2.0 | 2.0 | 2.0 |
| $Ta_2O_5$ | 6.5 | 6.5 | 6.5 |
| $Gd_2O_3$ | 5.0 | 5.0 | 5.0 |
| $Y_2O_3$ | 0.0 | 0.0 | 0.0 |
| $Yb_2O_3$ | 1.0 | 2.0 | 4.0 |
| $WO_3$ | 4.0 | 4.0 | 4.0 |
| $WO_3 + Nb_2O_5$ | 13.0 | 13.0 | 13.0 |
| nd | 1.89854 | 1.89979 | 1.89658 |
| vd | 35.6 | 35.3 | 35.7 |

TABLE II-8

| Component (% by weight) | Comparative Example | | | | | | |
|---|---|---|---|---|---|---|---|
| | II-1 | II-2 | II-3 | II-4 | II-5 | II-6 | II-7 |
| $SiO_2$ | 7.2 | 7.2 | 6.6 | 6.6 | 10.0 | 6.3 | 0.0 |
| $B_2O_3$ | 12.5 | 11.5 | 13.2 | 13.2 | 13.0 | 12.7 | 23.0 |
| $K_2O$ | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 |
| $Li_2O$ | 0.5 | 1.5 | 0.0 | 0.0 | 0.0 | 0.0 | 0.0 |
| ZnO | 2.0 | 2.0 | 7.2 | 7.1 | 3.0 | 2.5 | 5.0 |
| BaO | 0.0 | 0.0 | 21.9 | 16.9 | 17.0 | 31.4 | 0.0 |
| $ZrO_2$ | 6.0 | 8.0 | 5.7 | 7.1 | 7.0 | 6.5 | 5.0 |
| $La_2O_3$ | 34.8 | 26.8 | 19.0 | 36.2 | 37.0 | 33.6 | 40.0 |
| $Nb_2O_5$ | 12.5 | 9.0 | 21.6 | 3.9 | 4.0 | 2.0 | 17.0 |
| $TiO_2$ | 0.0 | 2.0 | 3.9 | 9.0 | 9.0 | 5.0 | 5.0 |
| $Ta_2O_5$ | 10.0 | 6.0 | 0.0 | 0.0 | 0.0 | 0.0 | 5.0 |
| $Gd_2O_3$ | 7.0 | 26.0 | 0.0 | 0.0 | 0.0 | 0.0 | 0.0 |
| $Y_2O_3$ | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 |
| $WO_3$ | 7.5 | 0.0 | 0.3 | 0.0 | 0.0 | 0.0 | 0.0 |
| $WO_3 + Nb_2O_5$ | 20.0 | 9.0 | 21.9 | 3.9 | 4.0 | 2.0 | 17.0 |
| nd | Devitrification | 1.88638 | 1.87410 | 1.87247 | 1.85403 | 1.82546 | 1.90564 |
| vd | | 37.2 | 31.3 | 34.2 | 35.0 | 38.6 | 31.7 |

As seen from Tables II-1 to II-7 given above, the optical glass composition according to each of Examples II-1 to II-51 has a refractive index (nd) to the d-line falling within a high refractive index range of 1.88 or higher and 1.92 or lower and yet has an Abbe number (vd) to the d-line falling within a range of 33 or higher and 37 or lower.

TABLE III-1

| Component (% by weight) | Example | | | | | | | |
|---|---|---|---|---|---|---|---|---|
| | III-1 | III-2 | III-3 | III-4 | III-5 | III-6 | III-7 | III-8 |
| $SiO_2$ | 7.2 | 7.2 | 7.2 | 7.2 | 7.2 | 7.2 | 7.2 | 7.2 |
| $B_2O_3$ | 12.0 | 11.5 | 11.5 | 11.5 | 11.5 | 11.5 | 12.5 | 10.0 |
| $GeO_2$ | 0.0 | 0.0 | 0.0 | 0.0 | 0.0 | 0.0 | 0.0 | 0.0 |
| $Li_2O$ | 1.0 | 1.5 | 1.5 | 1.5 | 1.5 | 1.5 | 0.5 | 3.0 |
| ZnO | 2.0 | 2.0 | 2.0 | 2.0 | 2.0 | 2.0 | 2.0 | 2.0 |
| BaO | 0.0 | 0.0 | 0.0 | 0.0 | 0.0 | 0.0 | 0.0 | 0.0 |
| $ZrO_2$ | 6.0 | 8.0 | 8.0 | 8.0 | 8.0 | 8.0 | 8.0 | 8.0 |
| $La_2O_3$ | 36.8 | 36.8 | 26.8 | 46.8 | 46.8 | 36.8 | 36.8 | 36.8 |
| $Nb_2O_5$ | 12.0 | 8.5 | 8.5 | 9.0 | 9.0 | 16.0 | 8.5 | 8.5 |
| $TiO_2$ | 0.0 | 2.0 | 2.0 | 2.0 | 2.0 | 2.0 | 2.0 | 2.0 |
| $Ta_2O_5$ | 10.5 | 6.0 | 6.0 | 6.0 | 6.0 | 6.0 | 6.0 | 6.0 |
| $Gd_2O_3$ | 5.0 | 10.0 | 20.0 | 0.0 | 6.0 | 9.0 | 10.0 | 10.0 |
| $WO_3$ | 7.5 | 6.5 | 6.5 | 6.0 | 0.0 | 0.0 | 6.5 | 6.5 |
| α | 77 | 84 | 82 | 70 | 88 | 72 | 75 | 93 |
| Tg (° C.) | 628 | 619 | 621 | 617 | 626 | 621 | 653 | 598 |
| At (° C.) | 674 | 669 | 672 | 666 | 673 | 671 | 698 | 644 |
| nd | 1.89360 | 1.89462 | 1.88983 | 1.90108 | 1.89482 | 1.91308 | 1.89206 | 1.89120 |
| vd | 34.8 | 35.1 | 35.3 | 35.5 | 36.9 | 33.7 | 35.0 | 35.8 |

TABLE III-2

| Component (% by weight) | Example | | | | | | | |
|---|---|---|---|---|---|---|---|---|
| | III-9 | III-10 | III-11 | III-12 | III-13 | III-14 | III-15 | III-16 |
| $SiO_2$ | 7.2 | 7.2 | 8.0 | 5.0 | 7.2 | 7.2 | 7.2 | 7.2 |
| $B_2O_3$ | 10.5 | 10.5 | 10.7 | 13.7 | 11.5 | 11.5 | 11.5 | 11.5 |
| $GeO_2$ | 0.0 | 0.0 | 0.0 | 0.0 | 0.0 | 0.0 | 0.0 | 0.0 |
| $Li_2O$ | 1.5 | 1.5 | 1.5 | 1.5 | 1.5 | 1.5 | 1.5 | 1.5 |
| ZnO | 3.0 | 3.0 | 2.0 | 2.0 | 2.0 | 2.0 | 2.0 | 2.0 |
| BaO | 0.0 | 0.0 | 0.0 | 0.0 | 0.0 | 0.0 | 0.0 | 0.0 |
| $ZrO_2$ | 10.0 | 4.0 | 8.0 | 8.0 | 8.0 | 8.0 | 8.0 | 8.0 |
| $La_2O_3$ | 34.8 | 38.8 | 36.8 | 36.8 | 46.8 | 46.3 | 26.8 | 26.8 |
| $Nb_2O_5$ | 8.5 | 8.5 | 8.5 | 8.5 | 14.5 | 14.5 | 9.0 | 9.0 |
| $TiO_2$ | 2.0 | 2.0 | 2.0 | 2.0 | 2.0 | 2.0 | 2.0 | 2.0 |
| $Ta_2O_5$ | 6.0 | 6.0 | 6.0 | 6.0 | 6.0 | 6.0 | 6.0 | 6.0 |
| $Gd_2O_3$ | 10.0 | 12.0 | 10.0 | 10.0 | 0.0 | 0.5 | 25.5 | 13.0 |
| $WO_3$ | 6.5 | 6.5 | 6.5 | 6.5 | 0.5 | 0.5 | 0.5 | 13.0 |
| α | 84 | 84 | 83 | 85 | 83 | 85 | 84 | 80 |
| Tg (° C.) | 621 | 617 | 624 | 612 | 624 | 622 | 631 | 610 |
| At (° C.) | 665 | 664 | 670 | 656 | 672 | 668 | 682 | 658 |
| nd | 1.89555 | 1.89495 | 1.89555 | 1.89495 | 1.90727 | 1.91241 | 1.88890 | 1.89574 |
| vd | 35.3 | 35.0 | 35.3 | 35.0 | 33.6 | 34.5 | 36.8 | 33.3 |

TABLE III-3

| Component (% by weight) | Example | | | | | | | |
|---|---|---|---|---|---|---|---|---|
| | III-17 | III-18 | III-19 | III-20 | III-21 | III-22 | III-23 | III-24 |
| $SiO_2$ | 7.2 | 7.2 | 8.0 | 8.0 | 7.2 | 7.2 | 7.2 | 7.2 |
| $B_2O_3$ | 11.5 | 11.5 | 12.7 | 9.7 | 10.5 | 10.5 | 11.5 | 11.5 |
| $GeO_2$ | 0.0 | 0.0 | 0.0 | 0.0 | 0.0 | 0.0 | 0.0 | 0.0 |
| $Li_2O$ | 1.5 | 1.5 | 0.5 | 0.5 | 1.5 | 1.5 | 1.5 | 1.5 |
| ZnO | 2.0 | 2.0 | 3.0 | 6.0 | 3.0 | 3.0 | 2.0 | 2.0 |
| BaO | 0.0 | 0.0 | 0.0 | 0.0 | 0.0 | 0.0 | 0.0 | 0.0 |
| $ZrO_2$ | 8.0 | 8.0 | 8.0 | 8.0 | 2.0 | 1.0 | 8.0 | 8.0 |
| $La_2O_3$ | 33.8 | 31.8 | 35.8 | 35.8 | 42.8 | 43.8 | 36.8 | 36.8 |
| $Nb_2O_5$ | 0.0 | 0.0 | 8.5 | 8.5 | 8.5 | 8.5 | 8.5 | 8.5 |
| $TiO_2$ | 5.0 | 7.0 | 2.0 | 2.0 | 2.0 | 2.0 | 2.0 | 2.0 |
| $Ta_2O_5$ | 6.0 | 6.0 | 6.0 | 6.0 | 6.0 | 6.0 | 0.0 | 10.0 |
| $Gd_2O_3$ | 15.0 | 15.0 | 9.0 | 9.0 | 10.0 | 10.0 | 16.0 | 6.0 |
| $WO_3$ | 10.0 | 10.0 | 6.5 | 6.5 | 6.5 | 6.5 | 6.5 | 6.5 |
| α | 85 | 86 | 75 | 79 | 83 | 90 | 89 | 80 |
| Tg (° C.) | 625 | 624 | 646 | 643 | 614 | 612 | 622 | 615 |
| At (° C.) | 673 | 672 | 696 | 694 | 659 | 659 | 668 | 664 |
| nd | 1.89031 | 1.89894 | 1.88848 | 1.90942 | 1.89458 | 1.89260 | 1.88960 | 1.89913 |
| vd | 34.9 | 33.1 | 35.4 | 34.4 | 36.0 | 36.0 | 36.4 | 34.6 |

TABLE III-4

| Component (% by weight) | Example | | | | | | | |
|---|---|---|---|---|---|---|---|---|
| | III-25 | III-26 | III-27 | III-28 | III-29 | III-30 | III-31 | III-32 |
| $SiO_2$ | 7.2 | 8.2 | 8.2 | 8.2 | 7.2 | 7.2 | 8.2 | 10.2 |
| $B_2O_3$ | 11.5 | 10.5 | 10.5 | 10.5 | 11.5 | 11.5 | 10.5 | 8.5 |
| $GeO_2$ | 0.0 | 0.0 | 0.0 | 0.0 | 2.0 | 4.0 | 0.0 | 0.0 |
| $Li_2O$ | 1.5 | 1.5 | 1.5 | 1.5 | 1.5 | 1.5 | 1.5 | 1.5 |
| $ZnO$ | 2.0 | 2.0 | 2.0 | 2.0 | 2.0 | 2.0 | 2.0 | 2.0 |
| $BaO$ | 0.0 | 0.0 | 0.0 | 0.0 | 0.0 | 0.0 | 0.0 | 0.0 |
| $ZrO_2$ | 8.0 | 9.0 | 9.0 | 9.0 | 8.0 | 8.0 | 9.0 | 9.0 |
| $La_2O_3$ | 36.8 | 37.3 | 42.3 | 44.3 | 34.8 | 32.8 | 44.3 | 37.3 |
| $Nb_2O_5$ | 8.5 | 9.5 | 9.0 | 8.5 | 8.5 | 8.5 | 8.3 | 9.5 |
| $TiO_2$ | 2.0 | 2.0 | 2.0 | 2.0 | 2.0 | 2.0 | 2.2 | 2.0 |
| $Ta_2O_5$ | 15.0 | 6.5 | 6.5 | 6.5 | 6.0 | 6.0 | 6.5 | 6.5 |
| $Gd_2O_3$ | 1.0 | 10.0 | 5.0 | 3.0 | 10.0 | 10.0 | 3.0 | 10.0 |
| $WO_3$ | 6.5 | 3.5 | 4.0 | 4.5 | 6.5 | 6.5 | 4.5 | 3.5 |
| α | 77 | 84 | 84 | 84 | 81 | 78 | 85 | 76 |
| Tg (° C.) | 614 | 630 | 627 | 626 | 620 | 618 | 626 | 639 |
| At (° C.) | 663 | 678 | 674 | 676 | 666 | 667 | 678 | 693 |
| nd | 1.90213 | 1.89759 | 1.89865 | 1.89745 | 1.88801 | 1.88166 | 1.89906 | 1.89719 |
| vd | 33.6 | 35.2 | 35.9 | 35.6 | 35.1 | 35.2 | 35.5 | 34.6 |

TABLE III-5

| Component (% by weight) | Example | | | | | | | |
|---|---|---|---|---|---|---|---|---|
| | III-33 | III-34 | III-35 | III-36 | III-37 | III = 38 | III-39 | III-40 |
| $SiO_2$ | 3.0 | 1.0 | 7.2 | 6.2 | 6.2 | 5.2 | 3.2 | 3.2 |
| $B_2O_3$ | 15.7 | 17.7 | 10.5 | 10.5 | 10.5 | 11.5 | 11.5 | 11.5 |
| $GeO_2$ | 0.0 | 0.0 | 0.0 | 0.0 | 0.0 | 2.0 | 8.0 | 12.0 |
| $Li_2O$ | 1.5 | 1.5 | 1.5 | 1.5 | 1.5 | 1.5 | 1.5 | 1.5 |
| $ZnO$ | 2.0 | 2.0 | 2.0 | 0.0 | 0.0 | 2.0 | 2.0 | 2.0 |
| $BaO$ | 0.0 | 0.0 | 1.0 | 8.0 | 14.0 | 0.0 | 0.0 | 0.0 |
| $ZrO_2$ | 9.0 | 9.0 | 9.0 | 8.0 | 7.0 | 8.0 | 8.0 | 8.0 |
| $La_2O_3$ | 37.3 | 37.3 | 44.3 | 41.3 | 36.3 | 36.8 | 32.8 | 28.8 |
| $Nb_2O_5$ | 9.5 | 9.5 | 8.3 | 8.3 | 8.3 | 8.5 | 8.5 | 8.5 |
| $TiO_2$ | 2.0 | 2.0 | 2.2 | 2.2 | 2.2 | 2.0 | 2.0 | 2.0 |
| $Ta_2O_5$ | 6.5 | 6.5 | 6.5 | 6.5 | 6.5 | 10.0 | 10.0 | 10.0 |
| $Gd_2O_3$ | 10.0 | 10.0 | 3.0 | 3.0 | 3.0 | 6.0 | 6.0 | 6.0 |
| $WO_3$ | 3.5 | 3.5 | 4.5 | 4.5 | 4.5 | 6.5 | 6.5 | 6.5 |
| α | 82 | 84 | 87 | 94 | 95 | 82 | 80 | 72 |
| Tg (° C.) | 609 | 602 | 624 | 626 | 617 | 614 | 610 | 610 |
| At (° C.) | 652 | 644 | 675 | 676 | 666 | 664 | 658 | 655 |
| nd | 1.89903 | 1.89998 | 1.90705 | 1.89674 | 1.88098 | 1.90839 | 1.90759 | 1.89364 |
| vd | 35.5 | 35.6 | 36.1 | 35.9 | 35.5 | 34.1 | 33.9 | 33.9 |

TABLE III-6

| Component (% by weight) | Comparative Example | |
|---|---|---|
| | III-1 | III-2 |
| $SiO_2$ | 7.2 | 7.2 |
| $B_2O_3$ | 8.0 | 13.0 |
| $Li_2O$ | 5.0 | 0.0 |
| $ZnO$ | 2.0 | 2.0 |
| $ZrO_2$ | 8.0 | 8.0 |
| $La_2O_3$ | 36.8 | 36.8 |
| $Nb_2O_5$ | 8.5 | 8.5 |
| $TiO_2$ | 2.0 | 2.0 |
| $Ta_2O_5$ | 6.0 | 6.0 |
| $Gd_2O_3$ | 10.0 | 10.0 |
| $WO_3$ | 6.5 | 6.5 |
| α | Devitrification | 73 |
| Tg (° C.) | | 680 |
| At (° C.) | | 725 |
| nd | | 1.89686 |
| vd | | 35.3 |

As seen from Tables III-1 to III-5 given above, the optical glass composition according to each of Examples III-1 to III-40 has a refractive index (nd) to the d-line falling within a high refractive index range of 1.88 or higher and 1.92 or lower and yet has an Abbe number (vd) to the d-line falling within a range of 33 or higher and 37 or lower and a yield temperature of 700° C. or lower.

TABLE IV-1

| Component (% by weight) | Example | | | | | | | |
|---|---|---|---|---|---|---|---|---|
| | IV-1 | IV-2 | IV-3 | IV-4 | IV-5 | IV-6 | IV-7 | IV-8 |
| $SiO_2$ | 7.2 | 7.2 | 7.2 | 7.2 | 7.2 | 7.2 | 7.2 | 7.2 |
| $B_2O_3$ | 12.0 | 11.5 | 11.5 | 11.5 | 11.5 | 11.5 | 11.5 | 12.5 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.0 | 1.5 | 1.5 | 1.5 | 1.5 | 1.5 | 1.5 | 0.5 |
| ZnO | 2.0 | 2.0 | 2.0 | 2.0 | 2.0 | 2.0 | 2.0 | 2.0 |
| $ZrO_2$ | 6.0 | 8.0 | 8.0 | 8.0 | 8.0 | 8.0 | 8.0 | 8.0 |
| $La_2O_3$ | 36.8 | 36.8 | 26.8 | 46.8 | 46.8 | 36.8 | 36.8 | 36.8 |
| $Nb_2O_5$ | 12.0 | 8.5 | 8.5 | 9.0 | 9.0 | 10.0 | 16.0 | 8.5 |
| $TiO_2$ | 0.0 | 2.0 | 2.0 | 2.0 | 2.0 | 2.0 | 2.0 | 2.0 |
| $Ta_2O_5$ | 10.5 | 6.0 | 6.0 | 6.0 | 6.0 | 6.0 | 6.0 | 6.0 |
| $Gd_2O_3$ | 5.0 | 10.0 | 20.0 | 0.0 | 6.0 | 15.0 | 9.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| WO3 | 7.5 | 6.5 | 6.5 | 6.0 | 0.0 | 0.0 | 0.0 | 6.5 |
| R'O | 0 | 0 | 0 | 0 | 0 | 0 | 0 | 0 |
| nd | 1.89360 | 1.89462 | 1.88983 | 1.90108 | 1.89482 | 1.89206 | 1.91308 | 1.89206 |
| vd | 34.8 | 35.1 | 35.3 | 35.5 | 36.9 | 35.6 | 33.7 | 35.0 |

TABLE IV-2

| Component (% by weight) | Example | | | | | | | |
|---|---|---|---|---|---|---|---|---|
| | IV-9 | IV-10 | IV-11 | IV-12 | IV-13 | IV-14 | IV-15 | IV-16 |
| $SiO_2$ | 7.2 | 7.2 | 7.2 | 8.0 | 5.0 | 7.2 | 7.2 | 7.2 |
| $B_2O_3$ | 10.0 | 10.5 | 10.5 | 10.7 | 13.7 | 11.5 | 11.5 | 11.5 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 3.0 | 1.5 | 1.5 | 1.5 | 1.5 | 1.5 | 1.5 | 1.5 |
| ZnO | 2.0 | 3.0 | 3.0 | 2.0 | 2.0 | 2.0 | 2.0 | 2.0 |
| $ZrO_2$ | 8.0 | 10.0 | 4.0 | 8.0 | 8.0 | 8.0 | 8.0 | 8.0 |
| $La_2O_3$ | 36.8 | 34.8 | 38.8 | 36.8 | 36.8 | 46.8 | 46.3 | 26.8 |
| $Nb_2O_5$ | 8.5 | 8.5 | 8.5 | 8.5 | 8.5 | 14.5 | 14.5 | 9.0 |
| $TiO_2$ | 2.0 | 2.0 | 2.0 | 2.0 | 2.0 | 2.0 | 2.0 | 2.0 |
| $Ta_2O_5$ | 6.0 | 6.0 | 6.0 | 6.0 | 6.0 | 6.0 | 6.0 | 6.0 |
| $Gd_2O_3$ | 10.0 | 10.0 | 12.0 | 10.0 | 10.0 | 0.0 | 0.5 | 25.5 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| WO3 | 6.5 | 6.5 | 6.5 | 6.5 | 6.5 | 0.5 | 0.5 | 0.5 |
| R'O | 0 | 0 | 0 | 0 | 0 | 0 | 0 | 0 |
| nd | 1.89120 | 1.89555 | 1.89495 | 1.89555 | 1.89495 | 1.90727 | 1.91241 | 1.88890 |
| vd | 35.8 | 35.3 | 35.0 | 35.3 | 35.0 | 33.6 | 34.5 | 36.8 |

TABLE IV-3

| Component (% by weight) | Example | | | | | | | |
|---|---|---|---|---|---|---|---|---|
| | IV-17 | IV-18 | IV-19 | IV-20 | IV-21 | IV-22 | IV-23 | IV-24 |
| $SiO_2$ | 7.2 | 7.2 | 7.2 | 8.0 | 8.0 | 7.2 | 7.2 | 7.2 |
| $B_2O_3$ | 11.5 | 11.5 | 11.5 | 12.7 | 9.7 | 10.5 | 10.5 | 11.5 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.5 | 1.5 | 1.5 | 0.5 | 0.5 | 1.5 | 1.5 | 1.5 |
| ZnO | 2.0 | 2.0 | 2.0 | 3.0 | 6.0 | 3.0 | 3.0 | 2.0 |
| $ZrO_2$ | 8.0 | 8.0 | 8.0 | 8.0 | 8.0 | 2.0 | 1.0 | 8.0 |
| $La_2O_3$ | 26.8 | 33.8 | 31.8 | 35.8 | 35.8 | 42.8 | 43.8 | 36.8 |
| $Nb_2O_5$ | 9.0 | 0.0 | 0.0 | 8.5 | 8.5 | 8.5 | 8.5 | 8.5 |
| $TiO_2$ | 2.0 | 5.0 | 7.0 | 2.0 | 2.0 | 2.0 | 2.0 | 2.0 |
| $Ta_2O_5$ | 6.0 | 6.0 | 6.0 | 6.0 | 6.0 | 6.0 | 6.0 | 0.0 |
| $Gd_2O_3$ | 13.0 | 15.0 | 15.0 | 9.0 | 9.0 | 10.0 | 10.0 | 16.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| WO3 | 13.0 | 10.0 | 10.0 | 6.5 | 6.5 | 6.5 | 6.5 | 6.5 |

TABLE IV-3-continued

| Component (% by weight) | Example | | | | | | | |
|---|---|---|---|---|---|---|---|---|
| | IV-17 | IV-18 | IV-19 | IV-20 | IV-21 | IV-22 | IV-23 | IV-24 |
| R'O | 0 | 0 | 0 | 0 | 0 | 0 | 0 | 0 |
| nd | 1.89574 | 1.89031 | 1.89894 | 1.88848 | 1.90942 | 1.89458 | 1.89260 | 1.88960 |
| vd | 33.3 | 34.9 | 33.1 | 35.4 | 34.4 | 36.0 | 36.0 | 36.4 |

TABLE IV-4

| Component (% by weight) | Example | | | | | | | |
|---|---|---|---|---|---|---|---|---|
| | IV-25 | IV-26 | IV-27 | IV-28 | IV-29 | IV-30 | IV-31 | IV-32 |
| $SiO_2$ | 7.2 | 7.2 | 7.2 | 8.2 | 8.2 | 8.2 | 8.2 | 10.2 |
| $B_2O_3$ | 11.5 | 11.5 | 11.5 | 10.5 | 10.5 | 10.5 | 10.5 | 8.5 |
| $GeO_2$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 1.5 | 1.5 | 1.5 | 1.5 | 1.5 | 1.5 | 1.5 | 1.5 |
| ZnO | 2.0 | 2.0 | 2.0 | 2.0 | 2.0 | 2.0 | 2.0 | 2.0 |
| $ZrO_2$ | 8.0 | 8.0 | 8.0 | 9.0 | 9.0 | 9.0 | 9.0 | 9.0 |
| $La_2O_3$ | 36.8 | 36.8 | 36.8 | 37.3 | 42.3 | 44.3 | 44.3 | 37.3 |
| $Nb_2O_5$ | 8.5 | 8.5 | 8.5 | 9.5 | 9.0 | 8.5 | 8.3 | 9.5 |
| $TiO_2$ | 2.0 | 2.0 | 2.0 | 2.0 | 2.0 | 2.0 | 2.2 | 2.0 |
| $Ta_2O_5$ | 1.0 | 10.0 | 15.0 | 6.5 | 6.5 | 6.5 | 6.5 | 6.5 |
| $Gd_2O_3$ | 15.0 | 6.0 | 1.0 | 10.0 | 5.0 | 3.0 | 3.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| WO3 | 6.5 | 6.5 | 6.5 | 3.5 | 4.0 | 4.5 | 4.5 | 3.5 |
| R'O | 0 | 0 | 0 | 0 | 0 | 0 | 0 | 0 |
| nd | 1.89047 | 1.89913 | 1.90213 | 1.89759 | 1.89865 | 1.89745 | 1.89906 | 1.89719 |
| vd | 36.1 | 34.6 | 33.6 | 35.2 | 35.9 | 35.6 | 35.5 | 34.6 |

TABLE IV-5

| Component (% by weight) | Example | | | | | | | |
|---|---|---|---|---|---|---|---|---|
| | IV-33 | IV-34 | IV-35 | IV-36 | IV-37 | IV-38 | IV-39 | IV-40 |
| $SiO_2$ | 3.0 | 1.0 | 7.2 | 7.2 | 7.2 | 7.2 | 7.2 | 7.2 |
| $B_2O_3$ | 15.7 | 17.7 | 13.0 | 12.5 | 11.5 | 11.5 | 11.5 | 11.5 |
| $GeO_2$ | 0.0 | 0.0 | 0.0 | 0.0 | 0.0 | 0.0 | 2.0 | 4.0 |
| $K_2O$ | 0.0 | 0.0 | 0.0 | 0.0 | 0.0 | 1.5 | 0.0 | 0.0 |
| $Na_2O$ | 0.0 | 0.0 | 0.0 | 0.5 | 1.5 | 0.0 | 0.0 | 0.0 |
| $Li_2O$ | 1.5 | 1.5 | 0.0 | 0.0 | 0.0 | 0.0 | 1.5 | 1.5 |
| ZnO | 2.0 | 2.0 | 2.0 | 2.0 | 2.0 | 2.0 | 2.0 | 2.0 |
| $ZrO_2$ | 9.0 | 9.0 | 8.0 | 8.0 | 8.0 | 8.0 | 8.0 | 8.0 |
| $La_2O_3$ | 37.3 | 37.3 | 36.8 | 36.8 | 36.8 | 36.8 | 34.8 | 32.8 |
| $Nb_2O_5$ | 9.5 | 9.5 | 8.5 | 8.5 | 8.5 | 8.5 | 8.5 | 8.5 |
| $TiO_2$ | 2.0 | 2.0 | 2.0 | 2.0 | 2.0 | 2.0 | 2.0 | 2.0 |
| $Ta_2O_5$ | 6.5 | 6.5 | 6.0 | 6.0 | 6.0 | 6.0 | 6.0 | 6.0 |
| $Gd_2O_3$ | 10.0 | 10.0 | 10.0 | 10.0 | 10.0 | 10.0 | 10.0 | 10.0 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| WO3 | 3.5 | 3.5 | 6.5 | 6.5 | 6.5 | 6.5 | 6.5 | 6.5 |
| R'O | 0 | 0 | 0 | 0 | 0 | 0 | 0 | 0 |
| nd | 1.89903 | 1.89998 | 1.89686 | 1.89190 | 1.89090 | 1.89288 | 1.88801 | 1.88166 |
| vd | 35.5 | 35.6 | 35.3 | 35.2 | 35.3 | 34.8 | 35.1 | 35.2 |

TABLE IV-6

| Component (% by weight) | Example | | | | | | | |
|---|---|---|---|---|---|---|---|---|
| | IV-41 | IV-42 | IV-43 | IV-44 | IV-45 | IV-46 | IV-47 | IV-48 |
| $SiO_2$ | 7.2 | 7.2 | 7.2 | 5.2 | 3.2 | 3.2 | 8.2 | 8.2 |
| $B_2O_3$ | 10.0 | 11.0 | 10.0 | 11.5 | 11.5 | 11.5 | 10.5 | 10.5 |
| $GeO_2$ | 0.0 | 0.0 | 0.0 | 2.0 | 8.0 | 12.0 | 0.0 | 0.0 |

TABLE IV-6-continued

| Component (% by weight) | Example | | | | | | | |
|---|---|---|---|---|---|---|---|---|
| | IV-41 | IV-42 | IV-43 | IV-44 | IV-45 | IV-46 | IV-47 | IV-48 |
| $K_2O$ | 3.0 | 0.0 | 0.0 | 0.0 | 0.0 | 0.0 | 0.0 | 0.0 |
| $Na_2O$ | 0.0 | 2.0 | 3.0 | 0.0 | 0.0 | 0.0 | 0.0 | 0.0 |
| $Li_2O$ | 0.0 | 0.0 | 0.0 | 1.5 | 1.5 | 1.5 | 1.5 | 1.5 |
| ZnO | 2.0 | 2.0 | 2.0 | 2.0 | 2.0 | 2.0 | 2.0 | 2.0 |
| $ZrO_2$ | 8.0 | 8.0 | 8.0 | 8.0 | 8.0 | 8.0 | 9.0 | 9.0 |
| $La_2O_3$ | 36.8 | 36.8 | 36.8 | 36.8 | 32.8 | 28.8 | 41.8 | 41.3 |
| $Nb_2O_5$ | 8.5 | 8.5 | 8.5 | 8.5 | 8.5 | 8.5 | 9.0 | 9.0 |
| $TiO_2$ | 2.0 | 2.0 | 2.0 | 2.0 | 2.0 | 2.0 | 2.0 | 2.0 |
| $Ta_2O_5$ | 6.0 | 6.0 | 6.0 | 10.0 | 10.0 | 10.0 | 6.5 | 6.5 |
| $Gd_2O_3$ | 10.0 | 10.0 | 10.0 | 6.0 | 6.0 | 6.0 | 5.0 | 5.0 |
| $Y_2O_3$ | 0.0 | 0.0 | 0.0 | 0.0 | 0.0 | 0.0 | 0.5 | 1.0 |
| $Yb_2O_3$ | 0.0 | 0.0 | 0.0 | 0.0 | 0.0 | 0.0 | 0.0 | 0.0 |
| WO3 | 6.5 | 6.5 | 6.5 | 6.5 | 6.5 | 6.5 | 4.0 | 4.0 |
| R'O | 0 | 0 | 0 | 0 | 0 | 0 | 0 | 0 |
| nd | 1.89585 | 1.89143 | 1.88700 | 1.90839 | 1.90759 | 1.89364 | 1.89892 | 1.89927 |
| vd | 34.6 | 36.6 | 37.0 | 34.1 | 33.9 | 33.9 | 35.5 | 35.5 |

TABLE IV-7

| Component (% by weight) | Example | | | | | |
|---|---|---|---|---|---|---|
| | IV-49 | IV-50 | IV-51 | IV-52 | IV-53 | IV-54 |
| $SiO_2$ | 8.2 | 8.2 | 8.2 | 8.2 | 8.2 | 8.2 |
| $B_2O_3$ | 10.5 | 10.5 | 10.5 | 10.5 | 10.5 | 10.5 |
| $GeO_2$ | 0.0 | 0.0 | 0.0 | 0.0 | 0.0 | 0.0 |
| $K_2O$ | 0.0 | 0.0 | 0.0 | 0.0 | 0.0 | 0.0 |
| $Na_2O$ | 0.0 | 0.0 | 0.0 | 0.0 | 0.0 | 0.0 |
| $Li_2O$ | 1.5 | 1.5 | 1.5 | 1.5 | 1.5 | 1.5 |
| ZnO | 2.0 | 2.0 | 2.0 | 2.0 | 2.0 | 2.0 |
| $ZrO_2$ | 9.0 | 9.0 | 9.0 | 9.0 | 9.0 | 9.0 |
| $La_2O_3$ | 40.3 | 38.3 | 41.8 | 41.3 | 40.3 | 38.3 |
| $Nb_2O_5$ | 9.0 | 9.0 | 9.0 | 9.0 | 9.0 | 9.0 |
| $TiO_2$ | 2.0 | 2.0 | 2.0 | 2.0 | 2.0 | 2.0 |
| $Ta_2O_5$ | 6.5 | 6.5 | 6.5 | 6.5 | 6.5 | 6.5 |
| $Gd_2O_3$ | 5.0 | 5.0 | 5.0 | 5.0 | 5.0 | 5.0 |
| $Y_2O_3$ | 2.0 | 4.0 | 0.0 | 0.0 | 0.0 | 0.0 |
| $Yb_2O_3$ | 0.0 | 0.0 | 0.5 | 1.0 | 2.0 | 4.0 |
| WO3 | 4.0 | 4.0 | 4.0 | 4.0 | 4.0 | 4.0 |
| R'O | 0 | 0 | 0 | 0 | 0 | 0 |
| nd | 1.89869 | 1.89677 | 1.89979 | 1.89854 | 1.89979 | 1.89658 |
| vd | 35.5 | 35.6 | 35.5 | 35.6 | 35.3 | 35.7 |

TABLE IV-8

| Component (% by weight) | Comparative Example | | | | | | | | |
|---|---|---|---|---|---|---|---|---|---|
| | IV-1 | IV-2 | IV-3 | IV-4 | IV-5 | IV-6 | IV-7 | IV-8 | IV-9 |
| $SiO_2$ | 6.6 | 6.6 | 6.6 | 6.5 | 10.0 | 6.0 | 6.3 | 6.6 | 6.0 |
| $B_2O_3$ | 13.2 | 13.2 | 13.1 | 10.5 | 13.0 | 8.0 | 12.7 | 13.2 | 8.0 |
| $K_2O$ | 0.0 | 0.0 | 0.0 | 0.0 | 0.0 | 0.0 | 0.0 | 0.0 | 0.0 |
| Na2O | 0.0 | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 | 0.0 |
| ZnO | 7.2 | 7.1 | 2.7 | 3.0 | 3.0 | 2.5 | 2.5 | 2.7 | 2.0 |
| BaO | 21.9 | 16.9 | 18.4 | 16.0 | 17.0 | 15.5 | 31.4 | 16.8 | 15.0 |
| $ZrO_2$ | 5.7 | 7.1 | 4.3 | 7.0 | 7.0 | 6.5 | 6.5 | 5.7 | 6.5 |
| $La_2O_3$ | 19.2 | 36.2 | 35.9 | 34.0 | 37.0 | 34.0 | 33.6 | 36.2 | 34.0 |
| $Nb_2O_5$ | 21.6 | 3.9 | 6.8 | 7.0 | 4.0 | 8.5 | 2.0 | 5.4 | 8.0 |
| $TiO_2$ | 3.9 | 9.0 | 12.4 | 16.0 | 9.0 | 19.0 | 5.0 | 13.4 | 20.5 |
| $Ta_2O_5$ | 0.0 | 0.0 | 0.0 | 0.0 | 0.0 | 0.0 | 0.0 | 0.0 | 0.0 |
| $Gd_2O_3$ | 0.0 | 0.0 | 0.0 | 0.0 | 0.0 | 0.0 | 0.0 | 0.0 | 0.0 |
| WO3 | 0.3 | 0.0 | 0.0 | 0.0 | 0.0 | 0.0 | 0.0 | 0.0 | 0.0 |
| R'O | 21.9 | 16.9 | 18.4 | 16.0 | 17.0 | 15.5 | 31.4 | 16.8 | 15.0 |
| nd | 1.87410 | 1.87247 | 1.89803 | 1.94875 | 1.85403 | 1.99450 | 1.82546 | 1.90047 | 2.00030 |
| vd | 31.3 | 34.2 | 31.4 | 28.3 | 35.0 | 25.9 | 38.6 | 30.7 | 25.5 |

As seen from Tables IV-1 to IV-7 given above, the optical glass composition according to each of Examples IV-1 to IV-54 has a refractive index (nd) to the d-line falling within a high refractive index range of 1.88 or higher and 1.92 or lower and yet has an Abbe number (vd) to the d-line falling within a range of 33 or higher and 37 or lower.

The optical glass composition of the present invention is suitable as the material of optical elements such as lens elements contained in a shooting lens system of a digital camera. Further, the optical glass composition of the present invention may be applied, for example, to lens elements of a pickup optical system used in an optical head device or to lens elements of an illumination optical system and a projection optical system used in a projector device. Then, the performance of these devices can be improved.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An optical glass composition comprising, in % by weight,
   1.0% or more and 12.0% or less of $SiO_2$,
   8.0% or more and 18.0% or less of $B_2O_3$,
   0% or more and 6.0% or less of ZnO,
   1.0% or more and 10.0% or less of $ZrO_2$,
   25.0% or more and 47.0% or less of $La_2O_3$,
   0% or more and 5.0% or less of $R_2O$ (here, R is at least one of Li, Na and K),
   0% or more and 15.0% or less of $Nb_2O_5$,
   0% or more and 7.0% or less of $TiO_2$,
   0% or more and 15.0% or less of $Ta_2O_5$,
   1.0% or more of $Nb_2O_5+TiO_2+Ta_2O_5$,
   0% or more and 25.5% or less of $Gd_2O_3$,
   0.5% or more and 15.0% or less of $WO_3$ and
   0.5% or more and 26.0% or less of $Gd_2O_3+WO_3$, and substantially not containing $Y_2O_3$, and having
   a refractive index (nd) to the d-line of 1.88 or higher and 1.92 or lower and an Abbe number (vd) to the d-line of 33 or higher and 37 or lower.

2. A preform comprising the optical glass composition as claimed in claim 1, that is softened by heating so as to be used at least for press molding.

3. An optical element comprising the optical glass composition as claimed in claim 1.

4. An optical glass composition comprising, in % by weight,
   1.0% or more and 12.0% or less of $SiO_2$,
   8.0% or more and 18.0% or less of $B_2O_3$,
   0% or more and 6.0% or less of ZnO,
   1.0% or more and 10.0% or less of $ZrO_2$,
   25.0% or more and 47.0% or less of $La_2O_3$,
   0% or more and 5.0% or less of $R_2O$ (here, R is at least One of Li, Na and K),
   0% or more and 15.0% or less of BaO,
   0% or more and 15.0% or less of $Nb_2O_5$,
   0% or more and 7.0% or less of $TiO_2$,
   0% or more and 15.0% or less of $Ta_2O_5$,
   2.0% or more of $Nb_2O_5+TiO_2+Ta_2O_5$,
   0% or more and 20.0% or less of $Gd_2O_3$,
   0.5% or more and 10.0% or less of $WO_3$ and
   10.0% or more and 16.0% or less of $Nb_2O_5+WO_3$, and substantially not containing $Y_2O_3$, and having
   a refractive index (nd) to the d-line of 1.88 or higher and 1.92 or lower and an Abbe number (vd) to the d-line of 33 or higher and 37 or lower.

5. A preform comprising the optical glass composition as claimed in claim 4, that is softened by heating so as to be used at least for press molding.

6. An optical element comprising the optical glass composition as claimed in claim 4.

7. An optical glass composition comprising, in % by weight,
   1.0% or more and 12.0% or less of $SiO_2$,
   8.0% or more and 18.0% or less of $B_2O_3$,
   0% or more and 6.0% or less of ZnO,
   1.0% or more and 10.0% or less of $ZrO_2$,
   25.0% or more and 47.0% or less of $La_2O_3$,
   0.5% or more and 4.0% or less of $Li_2O$,
   0% or more and 16.0% or less of $Nb_2O_5$,
   0% or more and 7.0% or less of $TiO_2$,
   0% or more and 6.5% or less of $Ta_2O_5$,
   1.0% or more of $Nb_2O_5+TiO_2+Ta_2O_5$,
   0% or more and 26.0% or less of $Gd_2O_3$ and
   0% or more and 15.0% or less of $WO_3$, and having
   a refractive index (nd) to the d-line of 1.88 or higher and 1.92 or lower, an Abbe number (vd) to the d-line of 33 or higher and 37 or lower and a yield temperature of 700° C. or lower.

8. A preform comprising the optical glass composition as claimed in claim 7, that is softened by heating so as to be used at least for press molding.

9. An optical element comprising the optical glass composition as claimed in claim 7.

10. An optical glass composition comprising, in % by weight,
    1.0% or more and 12.0% or less of $SiO_2$,
    8.5% or more and 18.0% or less of $B_2O_3$,
    0% or more and 6.0% or less of ZnO,
    1.0% or more and 10.0% or less of $ZrO_2$,
    25.0% or more and 47.0% or less of $La_2O_3$,
    0% or more and 5.0% or less of $R_2O$ (here, R is at least one of Li, Na and K),
    0% or more and 16.0% or less of $Nb_2O_5$,
    0% or more and 7.0% or less of $TiO_2$,
    0% or more and 15.0% or less of $Ta_2O_5$,
    1.0% or more of $Nb_2O_5+TiO_2+Ta_2O_5$,
    0% or more and 26.0% or less of $Gd_2O_3$ and
    0% or more and 13.0% or less of $WO_3$, and substantially not containing R'O (here, R' is at least one of Ba, Sr, Ca and Mg), and $Y_2O_3$, and having
    a refractive index (nd) to the d-line of 1.88 or higher 106 and 1.92 or lower and an Abbe number (vd) to the d-line of 33 or higher and 37 or lower.

11. A preform comprising the optical glass composition as claimed in claim 10, that is softened by heating so as to be used at least for press molding.

12. An optical element comprising the optical glass composition as claimed in claim 10.

13. An optical glass composition comprising, in % by weight,
    1.0% or more and 12.0% or less of $SiO_2$,
    8.0% or more and 18.0% or less of $B_2O_3$, 0% or more and 6.0% or less of ZnO,
1.0% or more and 10.0% or less of $ZrO_2$,
25.0% or more and 47.0% or less of $La_2O_3$,
0% or more and 5.0% or less of $R_2O$ (here, R is at least one of Li, Na and K),
0% or more and 15.0% or less of $Nb_2O_5$,
0% or more and 7.0% or less of $TiO_2$,
0% or more and 15.0% or less of $Ta_2O_5$,
1.0% or more of $Nb_2O_5+TiO_2+Ta_2O_5$,
0.5% or more and 25.5% or less of $Gd_2O_3$,
0.5% or more and 15.0% or less of $WO_3$ and
0.5% or more and 26.0% or less of $Gd_2O_3+WO_3$, and having
a refractive index (nd) to the d-line of 1.88 or higher and 1.92 or lower and an Abbe number (vd) to the d-line of 33 or higher and 37 or lower.

14. A preform comprising the optical glass composition as claimed in claim 13, that is softened by heating so as to be used at least for press molding.

15. An optical element comprising the optical glass composition as claimed in claim 13.

16. An optical glass composition comprising, in % by weight,
1.0% or more and 12.0% or less of $SiO_2$,
8.0% or more and 18.0% or less of $B_2O_3$,
0% or more and 6.0% or less of ZnO,
1.0% or more and 10.0% or less of $ZrO_2$,
25.0% or more and 47.0% or less of $La_2O_3$,
0% or more and 5.0% or less of $R_2O$ (here, R is at least one of Li, Na and K),
0% or more and 15.0% or less of BaO,
0% or more and 15.0% or less of $Nb_2O_5$,
0% or more and 7.0% or less of $TiO_2$,
0% or more and 15.0% or less of $Ta_2O_5$,
2.0% or more of $Nb_2O_5+TiO_2+Ta_2O_5$,
0.5% or more and 20.0% or less of $Gd_2O_3$,
0.5% or more and 10.0% or less of $WO_3$ and
10.0% or more and 16.0% or less of $Nb_2O_5+WO_3$, and having
a refractive index (nd) to the d-line of 1.88 or higher and 1.92 or lower and an Abbe number (vd) to the d-line of 33 or higher and 37 or lower.

17. A preform comprising the optical glass composition as claimed in claim 16, that is softened by heating so as to be used at least for press molding.

18. An optical element comprising the optical glass composition as claimed in claim 16.

19. An optical glass composition comprising, in % by weight,
1.0% or more and 12.0% or less of $SiO_2$,
8.0% or more and 18.0% or less of $B_2O_3$,
0% or more and 6.0% or less of ZnO,
1.0% or more and 10.0% or less of $ZrO_2$,
25.0% or more and 47.0% or less of $La_2O_3$,
0.5% or more and 4.0% or less of $Li_2O$,
0% or more and 16.0% or less of $Nb_2O_5$,
2.0% or more and 7.0% or less of $TiO_2$,
0% or more and 15.0% or less of $Ta_2O_5$,
1.0% or more of $Nb_2O_5+TiO_2+Ta_2O_5$,
0% or more and 26.0% or less of $Gd_2O_3$ and
0% or more and 15.0% or less of $WO_3$, and having
a refractive index (nd) to the d-line of 1.88 or higher and 1.92 or lower, an Abbe number (vd) to the d-line of 33 or higher and 37 or lower and a yield temperature of 700° C. or lower.

20. A preform comprising the optical glass composition as claimed in claim 19, that is softened by heating so as to be used at least for press molding.

21. An optical element comprising the optical glass composition as claimed in claim 19.

22. An optical glass composition comprising, in % by weight,
1.0% or more and 12.0% or less of $SiO_2$,
8.5% or more and 18.0% or less of $B_2O_3$,
0% or more and 6.0% or less of ZnO,
1.0% or more and 10.0% or less of $ZrO_2$,
25.0% or more and 47.0% or less of $La_2O_3$,
0% or more and 5.0% or less of $R_2O$ (here, R is at least one of Li, Na and K),
0% or more and 16.0% or less of $Nb_2O_5$,
0% or more and 7.0% or less of $TiO_2$,
0% or more and 15.0% or less of $Ta_2O_5$,
1.0% or more of $Nb_2O_5+TiO_2+Ta_2O_5$,
0.5% or more and 26.0% or less of $Gd_2O_3$ and
0% or more and 13.0% or less of $WO_3$, and
substantially not containing R'O (here, R' is at least one of Ba, Sr, Ca and Mg), and having
a refractive index (nd) to the d-line of 1.88 or higher 106 and 1.92 or lower and an Abbe number (vd) to the d-line of 33 or higher and 37 or lower.

23. A preform comprising the optical glass composition as claimed in claim 22, that is softened by heating so as to be used at least for press molding.

24. An optical element comprising the optical glass composition as claimed in claim 22.

25. An optical glass composition comprising, in % by weight,
1.0% or more and 12.0% or less of $SiO_2$,
8.0% or more and 18.0% or less of $B_2O_3$,
0% or more and 6.0% or less of ZnO,
1.0% or more and 10.0% or less of $ZrO_2$,
25.0% or more and 47.0% or less of $La_2O_3$,
0.5% or more and 4.0% or less of $Li_2O$,
8.5% or more and 16.0% or less of $Nb_2O_5$,
0% or more and 7.0% or less of $TiO_2$,
0% or more and 15.0% or less of $Ta_2O_5$,
1.0% or more of $Nb_2O_5+TiO_2+Ta_2O_5$,
0% or more and 26.0% or less of $Gd_2O_3$ and
0% or more and 15.0% or less of $WO_3$, and having
a refractive index (nd) to the d-line of 1.88 or higher and 1.92 or lower, an Abbe number (vd) to the d-line of 33 or higher and 37 or lower and a yield temperature of 700° C. or lower.

26. The optical glass composition as claimed in claim 25, wherein an amount of $Nb_2O_5$ is, in % by weight, 9.0% or more and 16.0% or less.

27. A preform comprising the optical glass composition as claimed in claim 25, that is softened by heating so as to be used at least for press molding.

28. An optical element comprising the optical glass composition as claimed in claim 25.

29. An optical glass composition comprising, in % by weight,
1.0% or more and 12.0% or less of $SiO_2$,
8.0% or more and 18.0% or less of $B_2O_3$,
0% or more and 6.0% or less of ZnO,
1.0% or more and 10.0% or less of $ZrO_2$,
25.0% or more and 47.0% or less of $La_2O_2$,
0.5% or more and 4.0% or less of $Li_2O$,
0% or more and 16.0% or less of $Nb_2O_5$,
0% or more and 7.0% or less of $TiO_2$,
0% or more and 15.0% or less of $Ta_2O_5$, 1.0% or more of $Nb_2O_5+TiO_2+Ta_2O_5$,
0% or more and 26.0% or less of $Gd_2O_3$ and
0% or more and 15.0% or less of $WO_3$, and having
a refractive index (nd) to the d-line of 1.88 or higher and 1.92 or lower, an Abbe number (vd) to the d-line of 33 or higher and 35.4 or lower and a yield temperature of 700° C. or lower.

30. A preform comprising the optical glass composition as claimed in claim 29, that is softened by heating so as to be used at least for press molding.

31. An optical element comprising the optical glass composition as claimed in claim 29.

* * * * *